(12) United States Patent
Uchiyama

(10) Patent No.: US 7,100,559 B2
(45) Date of Patent: Sep. 5, 2006

(54) ENGINE AIR INTAKE MANIFOLD

(75) Inventor: Shigeki Uchiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 351 days.

(21) Appl. No.: 10/761,460

(22) Filed: Jan. 22, 2004

(65) Prior Publication Data

US 2004/0159299 A1   Aug. 19, 2004

(30) Foreign Application Priority Data

Feb. 19, 2003 (JP) ............................. 2003-040772
Mar. 10, 2003 (JP) ............................. 2003-063061
Mar. 20, 2003 (JP) ............................. 2003-076919

(51) Int. Cl.
*F02M 35/10* (2006.01)

(52) U.S. Cl. ................. 123/184.38; 123/308; 123/432; 123/568.17

(58) Field of Classification Search ........... 123/184.38, 123/184.21, 184.53, 585, 308, 432, 572–574, 123/568.17

See application file for complete search history.

(56) References Cited

U.S. PATENT DOCUMENTS

| | | | | |
|---|---|---|---|---|
| 3,846,980 A | * | 11/1974 | DePalma | 60/279 |
| 4,741,295 A | * | 5/1988 | Hosoya et al. | 123/184.31 |
| 5,427,080 A | * | 6/1995 | Maeda et al. | 123/568.17 |
| 5,490,488 A | * | 2/1996 | Aversa et al. | 123/568.12 |
| 5,542,711 A | * | 8/1996 | Vaudry | 285/41 |
| 5,572,979 A | * | 11/1996 | Czadzeck | 123/568.17 |
| 5,642,697 A | * | 7/1997 | Jahrens et al. | 123/184.21 |
| 6,173,701 B1 | * | 1/2001 | Azuma | 123/568.17 |
| 6,189,521 B1 | * | 2/2001 | Hancock | 123/572 |
| 6,237,336 B1 | * | 5/2001 | Feucht et al. | 60/605.2 |
| 6,422,221 B1 | * | 7/2002 | Pietrowski et al. | 123/568.17 |
| 6,446,617 B1 | * | 9/2002 | Bianchi et al. | 123/568.17 |
| 6,752,115 B1 | * | 6/2004 | Fiesel et al. | 123/184.42 |
| 6,807,957 B1 | * | 10/2004 | Ko | 123/572 |
| 2005/0076892 A1 | * | 4/2005 | Nakamura et al. | 123/572 |
| 2005/0103315 A1 | * | 5/2005 | Kim | 123/572 |

FOREIGN PATENT DOCUMENTS

| | | |
|---|---|---|
| DE | 4235075 A1 | 4/1994 |
| DE | 19757986 A1 | 7/1999 |
| EP | 1122421 A2 | 8/2001 |
| JP | 5-030412 A | 2/1993 |
| JP | 2000-008968 A | 1/2000 |
| JP | 2001-123901 A | 5/2001 |

* cited by examiner

*Primary Examiner*—Tony M. Argenbright
*Assistant Examiner*—Katrina B. Harris
(74) *Attorney, Agent, or Firm*—Global IP Counselors

(57) ABSTRACT

An engine air intake manifold has two main body sections that are divided along an airflow direction and mated tightly against each other at oppositely facing mating parts so as to form an air intake passage therein. A gas passage is formed along the mating parts. The gas passage opens into a downstream portion of the air intake passage and supplies a secondary additive gas thereto. Preferably, the engine air intake manifold has air intake branch pipes with valve mounting blocks for mounting air intake control valves to a downstream portion of the air intake branch pipes.

38 Claims, 25 Drawing Sheets

ENGINE AIR INTAKE MANIFOLD

BACKGROUND OF THE INVENTION

1. Field of the Invention

The present invention relates to an air intake manifold for an engine. More particularly, the present invention relates to an engine air intake manifold having first and second main body sections that are divided along an airflow direction and form an air intake passage therebetween. The first and second main body sections have oppositely facing mating parts that form a gas passage for supplying a secondary additive gas to the intake air flowing inside the air intake manifold. Preferably, the engine air intake manifold includes an air intake branch pipe with a mounting block for mounting an air intake control valve that is inserted into a downstream portion of the air intake branch pipe.

2. Background Information

An air intake manifold for a multiple cylinder engine generally has a collector into which intake air is introduced to the cylinders. The air intake manifold has a plurality of air intake branch parts that distribute the air from the collector to the cylinders. When this kind of air intake manifold is used, a secondary additive gas (e.g., blow-by gas, EGR gas, or secondary air) is sometimes added to the main flow of air in order to reduce atmospheric pollutants in the exhaust gas and accomplish idle control. When blow-by gas, EGR gas, secondary air or other secondary additive gas is circulated with the engine intake air, it is generally introduced at the collector of the air intake manifold. However, if the engine has multiple cylinders, it is difficult to distribute the secondary additive gas to all the cylinders evenly and, since the position where the secondary additive gas is introduced is far from the cylinders, it is difficult to improve the control response of the secondary additive gas.

Consequently, as disclosed in Japanese Laid-Open Patent Publication No. 5-030412 and Japanese Laid-Open Patent Publication No. 2000-008968, there have been several attempts to introduce the secondary additive gas separately to each cylinder from downstream positions of the air intake branch pipes of the air intake manifold. More specifically, Japanese Laid-Open Patent Publication No. 5-030412 (pages 7 to 8, FIG. 3) discloses a configuration in which gas passages for delivering blow-by gas to each individual cylinder are provided in a mounting flange that is used for mounting the air intake manifold to the engine main body. On the other hand, Japanese Laid-Open Patent Publication No. 2000-008968 (pages 4 to 5, FIGS. 6 and 7) presents a configuration in which a spacer is arranged between the air intake manifold and the engine and gas passages for delivering EGR gas to each individual cylinder are provided in the spacer.

Moreover, an air intake manifold has been configured to introduce a secondary additive gas into the air intake passage of each air intake branch part in which a gas distribution pipe arranged on the outside of the air intake branch parts and gas passages that run from the gas distribution pipe to the air intake passages of the air intake branch parts.

More specifically, the air intake manifold described in Japanese Laid-Open Patent Publication No. 2001-123901 (pages 3 to 5, FIG. 2) has a gas distribution pipe that is arranged inside the collector and provided with a plurality of discharge openings corresponding to the entrances of the air intake passages of the air intake branch parts.

Also, Japanese Laid-Open Patent Publication No. 2001-123901 (pages 3 to 5, FIG. 2) discloses an air intake manifold in which an EGR gas distribution pipe that is arranged inside the collector and provided with a plurality of discharge openings or holes corresponding to the entrances of the air intake passages of the air intake branch parts in order to distribute the EGR gas uniformly to the all of the cylinders. The EGR gas distribution pipe is arranged inside the collector along the direction in which the cylinders are lined up and has discharge openings or holes in positions corresponding to the air intake branch pipes. This air intake manifold efficiently distributes EGR gas to the cylinders by blowing EGR gas toward the entrance of the air intake passages from the discharge openings of the gas distribution pipe located inside the collector.

In view of the above, it will be apparent to those skilled in the art from this disclosure that there exists a need for an improved air intake manifold for an engine. This invention addresses this need in the art as well as other needs, which will become apparent to those skilled in the art from this disclosure.

SUMMARY OF THE INVENTION

It has been discovered that when gas passages are provided which run from a secondary additive gas distribution pipe arranged on the outside to the air intake passage of each air intake branch part, it is necessary to form the same number of gas passages from the gas distribution pipe as there are cylinders on the outside of the air intake branch parts. As a result, there is the possibility that the cost and weight will rise due to the increased number of parts. Also, since the gas passages are formed on the outside of the air intake branch parts, the structure becomes complex and there is the possibility that the space occupied by the gas passages (equal in number to the cylinders) will hinder the arrangement of other parts.

In the case of the air intake manifold disclosed in Japanese Laid-Open Patent Publication No. 2001-123901, there is the possibility that the inside of the air intake passages will be contaminated because of the introduction of EGR gas inside the collector. Furthermore, the control response is poor because the EGR gas is introduced inside the collector, which is far from the cylinders.

In order to improve the operating performance and fuel efficiency of the engine, it is desirable to distribute the secondary additive gas uniformly to all of the cylinders. When the EGR gas is introduced into the intake air as described in Japanese Laid-Open Patent Publication No. 2001-123901, the distribution to the cylinders is not stable because it is affected by intake pulsation. More specifically, although the EGR gas distribution pipe is provided with a distribution hole for each cylinder, an intake pulsation that occurs at the distribution hole corresponding to one cylinder cannot be absorbed inside the EGR gas distribution pipe and affects the EGR gas delivered from the distribution holes corresponding to the adjacent cylinders, making it difficult to maintain the uniformity of the secondary additive gas distribution to the cylinders.

Moreover, it has been discovered that when an intake control valve is arranged in a downstream portion of the air intake manifold to impart a strong gas flow to the intake air flowing into the combustion chamber, it is possible that the intake control valve will be contaminated and suffer a malfunction if a secondary additive gas is introduced upstream of the intake control valve. Therefore, it is preferable to introduce the secondary additive gas at a position downstream of the intake control valve. The ideas of providing gas passages for delivering the secondary additive gas in the air intake manifold mounting flange or in a spacer disposed between the air intake manifold and the engine main body as described in Japanese Laid-Open Patent Publication No. 5-030412 and Japanese Laid-Open Patent Publication No. 2000-008968 are feasible solutions. However, in such a case, it is necessary to configure the gas passages in an arrangement that distributes the secondary additive gas to each cylinder. Consequently, the mounting flange or spacer must be enlarged in the vertical direction and the mating face of the engine main body must be increased to accommodate the increased size of the mounting flange or spacer, making it more difficult to reduce size and weight. Since it is necessary to enlarge the mating surface of the mounting flange, the mating surface of the engine main body must be enlarged and made with thicker walls. Consequently, shrinkage cavities occur more readily and the engine main body is difficult to cast.

One object of the present invention is to provide an engine air intake manifold configured to introduce a secondary additive gas, and that is configured to reduce the number of parts and the weight.

Another object of the present invention is to provide an air intake manifold configured to introduce a secondary additive gas, and that prevents contamination of the throttle valve and the inside of the air intake passages and that improves the control response of the secondary additive gas.

Yet another possible object of the present invention is to provide an air intake manifold in which a mounting block for mounting an air intake control valve is installed inside the downstream side of the air intake branch pipe(s) and a secondary additive gas can be introduced on the downstream side of the mounting block without increasing the size of the mounting flange provided for mounting the air intake manifold to the engine main body.

Regarding an engine air intake manifold provided with a gas passage for delivering a secondary additive gas to the intake air flowing through the air intake manifold, the object of the present invention is to increase the degree of uniformity with which the air intake manifold distributes the secondary additive gas to the cylinders of the engine by using a chamber to absorb pulsations and pressure fluctuations.

An engine air intake manifold in accordance with the present invention basically comprises an engine air intake manifold that is provided with a first main body section and a second main body section. The first main body section has a first mating part. The second main body section has a second mating part that is fixedly coupled to the first mating part to form an air intake passage therebetween. The first and second mating parts of the first and second main body sections is configured and arranged to be divided along an airflow direction of the air intake passage with a gas passage being formed by the mating parts in the airflow direction of the air intake passage and the gas passage opening into a downstream portion of the air intake passage to supply a secondary additive gas thereto.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
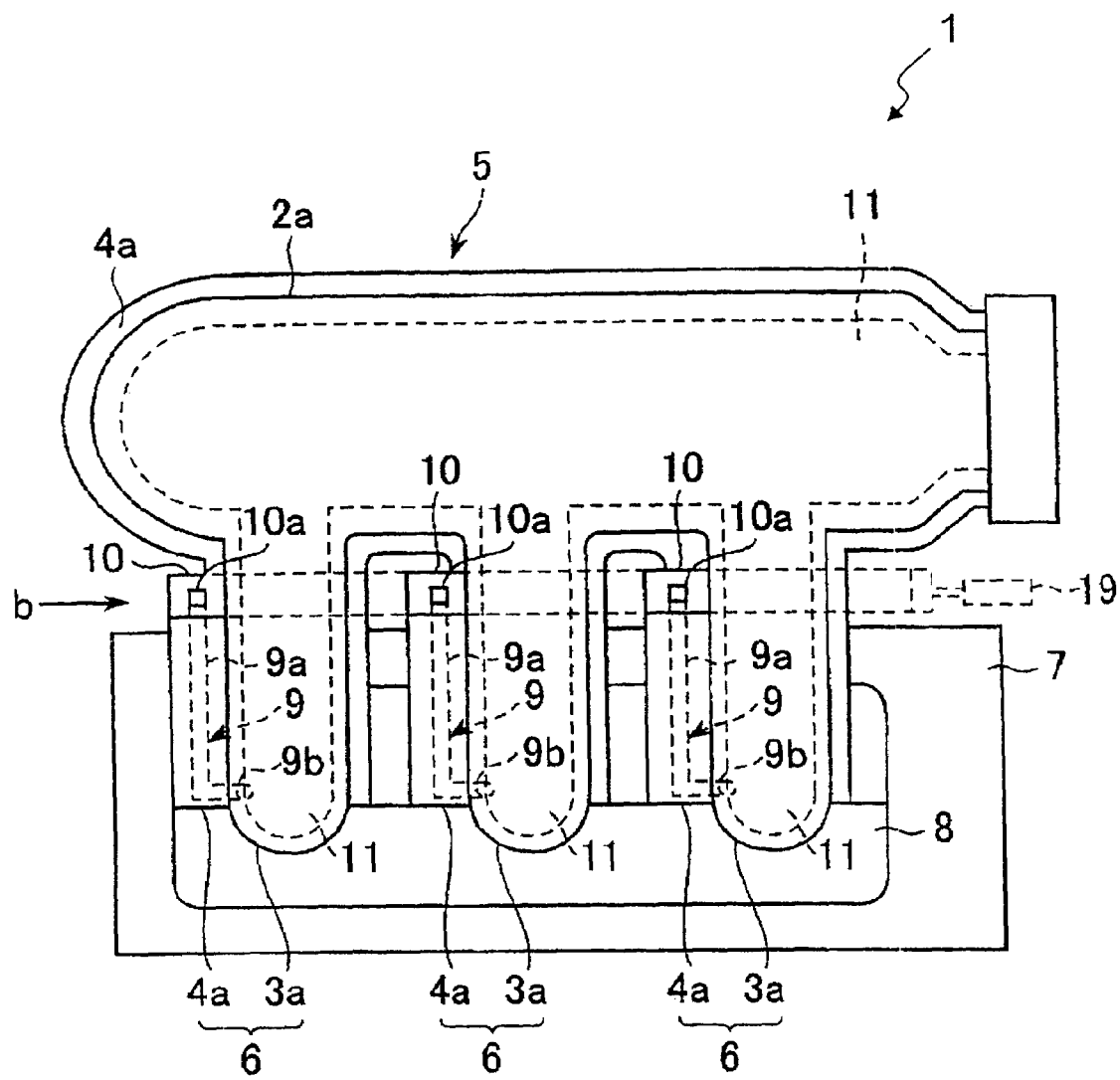
FIG. 1 is a side elevational view of an engine air intake manifold in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Referring initially to FIGS. 1–5, an air intake manifold 1 is illustrated in accordance with a first embodiment of the present invention. The air intake manifold 1 is configured and arranged for a multiple cylinder engine. This air intake manifold 1 is made of thermoplastic or thermosetting resin, and basically includes a pair (first and second) of main body sections 1a and 1b that are fixedly coupled together. Basically, the first main body section 1a includes a semi-cylindrical air intake passage forming part 2a, a plurality of semi-cylindrical air intake passage forming parts 3a that branch from the air intake passage forming part 2a, and a first flange part 4a formed in a radially protruding manner along the mating faces of the air intake-forming parts 2a and 3a. Similarly, the second main body section 1b includes a semi-cylindrical air intake passage forming part 2b, a plurality of semi-cylindrical air intake passage forming parts 3b that branch from the air intake passage forming part 2b, and a second flange part 4b formed in a radially protruding manner along the mating faces of the air intake-forming parts 2b and 3b.

The first and second main body sections 1a and 1b are mated tightly together at the first and second flange parts 4a and 4b, which serve as mating parts. The air intake passage forming parts 2a and 2b form a collector 5, while the air intake passage forming parts 3a and 3b form an air intake branch part comprising a plurality of air intake branch pipes 6 that branch from the collector 5. Each of the first and second main body sections 1a and 1b forms substantially half of the collector 5 that is in fluid communication with the air intake branch part (parts 3a and 3b). Also each of the first and second main body sections 1a and 1b forms substantially half of the air intake branch passages of the air intake branch pipes 6.

The first and second main body sections 1a and 1b also have first and second mounting flange parts 8a and 8b, respectively, which are formed on the downstream end parts of the air intake passage forming parts 3a and 3b. The first and second mounting flange parts 8a and 8b form a mounting flange 8 for mounting to an engine main body 7. Each of the air intake branch pipes 6 is integrally formed the mounting flange 8. In particular, the air intake passage forming parts 3a and 3b form a pair of semi-cylindrical parts that are formed integrally with the mounting flange parts 8a and 8b (which are for mounting the manifold to the engine main body). While only one of the air intake branch pipes 6 is illustrated in detail herein, it will be apparent from this disclosure that all of the air intake branch pipes 6 have the same structure.

Figure 2:
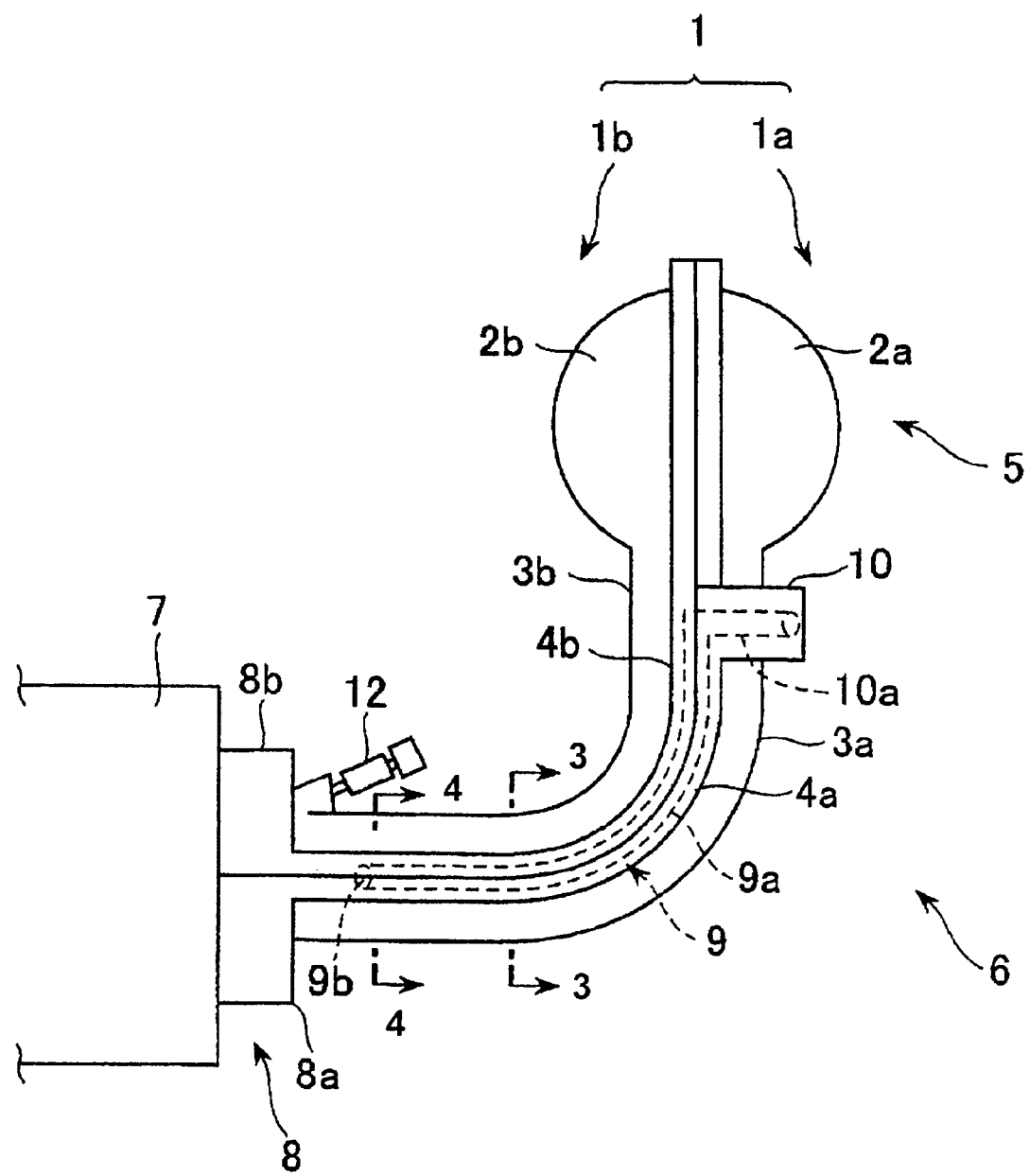
FIG. 2 is an end elevational view of the engine air intake manifold illustrated in FIG. 1 as viewed along the direction of arrow b in FIG. 1.

Air intake passages 11 for introducing air into the engine main body 7 are formed inside the collector 5 and the air intake branch pipes 6. The air intake branch pipes 6 are formed correspondently with respect to the cylinders of the engine and distribute/supply air to the cylinders. As shown in FIG. 2, the main body sections 1a and 1b divide the air intake manifold 1 in approximately two equal halves that are divided along the direction in which the air flows through the air intake branch pipes 6. The air intake branch pipes 6 curve along the direction in which the intake air flows and are configured such that they curve upward from downstream to upstream when the air intake manifold is mounted to the engine main body 7. The first and second flange parts 4a and 4b are formed so as to protrude radially from the air intake passage forming parts 2a and 2b and the air intake passage forming parts 3a and 3b. Thus, the body sections 1a and 1b are mated tightly together at the flange parts 4a and 4b, which serve as mating parts, so as to form the collector 5 and the air intake flange pipes 6.

Gas passages 9 for carrying a secondary additive gas are formed along the mating surfaces of the first and second flange parts 4a and 4b. In this first embodiment, the secondary additive gas is blow-by gas, but it is also acceptable to use EGR gas or idle-control-use secondary air. The gas passages 9 are configured and arranged to extend along the air intake branch pipes 6 such that each of the gas passages 9 generally slants downward from upstream to downstream when the air intake manifold 1 is mounted to the engine main body 7.

In the present invention, the gas passage 9 is formed in the mating parts 4a and 4b of the first and second main body sections 1a and 1b. As a result, it is not necessary to provide a separate gas passage on the outside of the air intake branch pipes 6. Thus, the cost and weight of the air intake manifold 1 can be reduced through reduction of the number of parts. Also, since the present invention introduces the secondary additive gas into a downstream portion of the air intake passages 11, contamination of the inside of the air intake passages 11 can be prevented and the control response of the air-fuel mixture can be improved.

Introducing parts 10 with introducing holes 10a are provided on an upstream end part of the gas passages 9. The introducing holes 10a are configured in such a manner as to merge uninterruptedly with the gas passages 9. A gas distribution pipe 19 arranged to traversely extend across the air intake branch pipes 6, and is mounted to the introducing parts 10. The gas distribution pipe 19 serves to introduce the secondary additive gas to the introducing holes 10a. Fuel injection devices 12 configured to inject fuel toward the air fuel passages 11 are mounted to the upper surface of the downstream end part of the main body section 1b.

Figure 3A:
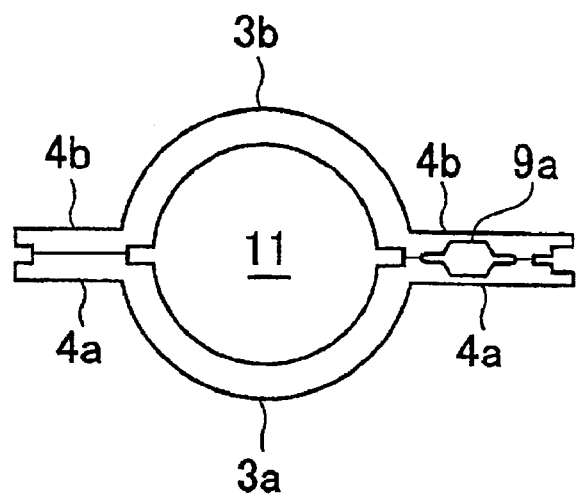
FIG. 3(a) is a cross sectional view of the engine air intake manifold illustrated in FIGS. 1 and 2 as seen along section line 3—3 of FIG. 2 wherein the flange parts are welded together by vibration welding, hot plate welding, ultrasonic welding, or other method.
Figure 3B:
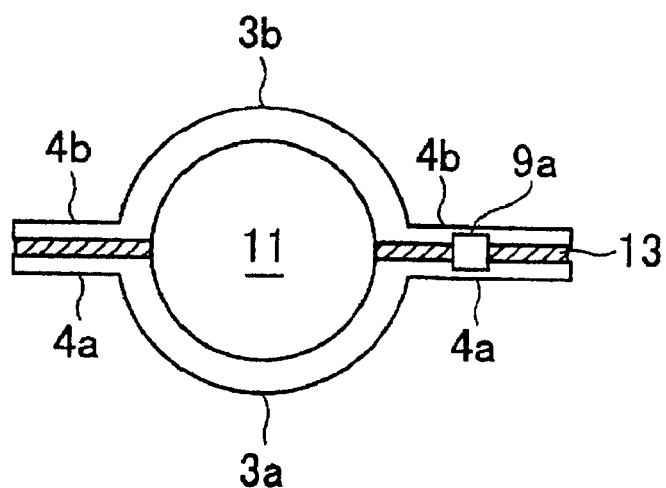
FIG. 3(b) is a cross sectional view of the engine air intake manifold illustrated in FIGS. 1 and 2 as seen along section line 3—3 of FIG. 2 wherein the flange parts are fixed together with a gasket disposed therebetween.
Figure 4A:
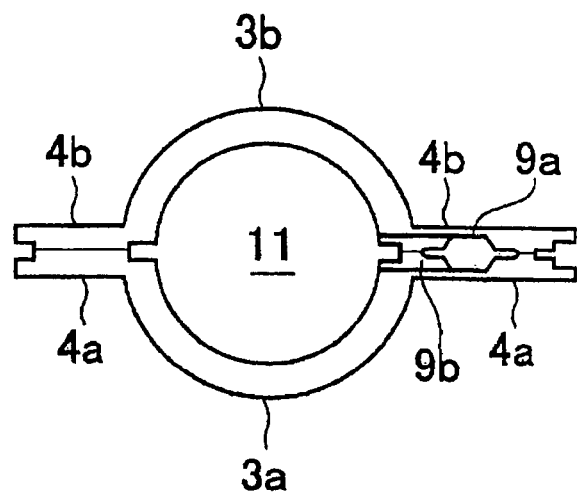
FIG. 4(a) is a cross sectional view of the engine air intake manifold illustrated in FIGS. 1 and 2 as seen along section line 4—4 of FIG. 2 wherein the flange parts are welded together by vibration welding, hot plate welding, ultrasonic welding, or other method.
Figure 4B:
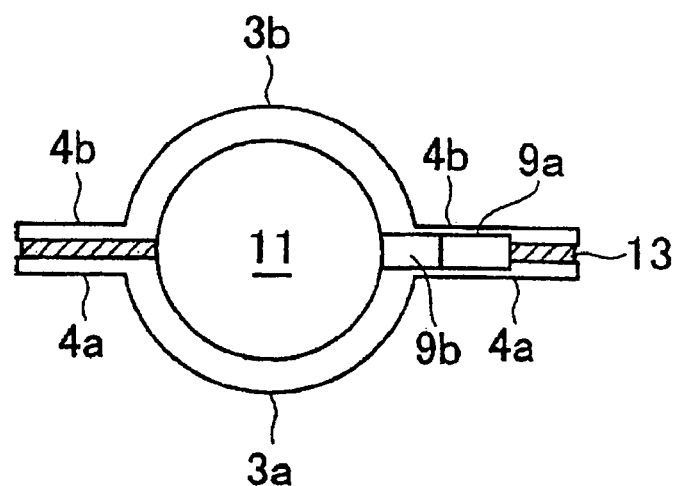
FIG. 4(b) is a cross sectional view of the engine air intake manifold illustrated in FIGS. 1 and 2 as seen along section line 4—4 of FIG. 2 wherein the flange parts are fixed together with a gasket disposed therebetween.

FIGS. 3(a) and 3(b) are cross sectional views taken along line 3—3 of FIG. 2, while FIGS. 4(a) and 4(b) are cross sectional views taken along line 4—4 of FIG. 2. FIG. 3(a) and FIG. 4(a) illustrate cases in which the flange parts 4a and 4b are welded together by vibration welding, hot plate welding, ultrasonic welding, or other method, while FIGS. 3(b) and 4(b) illustrate cases in which the flange parts 4a and 4b are fixed together with a gasket 13 disposed therebetween. It is also acceptable to form the air intake manifold 1 of aluminum and, when aluminum casting is used, fix the sections together with bolts. Although in the illustrated embodiment, the first passage portion 9a is formed by grooves provided in both flanges 4a and 4b, it is also acceptable for the first passage portion 9a to be formed by a groove in one or the other of the flanges 4a or 4b.

The gas passages 9 each have a first passage portion 9a and a second passage portion 9b. The first passage portions 9a are formed in the mating parts, and oriented along the direction in which the air flows, and runs to the vicinity of the mounting flange 8. First passage portions 9a serving as portions of the gas passages 9 for carrying the blow-by gas are formed along the mating surfaces of the flange parts 4a and 4b. Thus, the first passage portion 9a is provided for each air intake branch pipe 6 and each first passage portion 9a slants downward from upstream to downstream when the air intake manifold 1 is mounted to the engine main body 7. The second passage portions 9b continue from the downstream end of the first passage portions 9a and open into a downstream portion of the air intake passages 11. In this air intake manifold 1, the secondary additive gas is introduced into the upstream side of the first passage portions 9a from the introducing holes 10a, flows downward from along mating surfaces of the air intake branch pipes 6, and is fed into the air intake passages 11 from the second passage portions 9b in the vicinity of the mounting flange 8.

Figure 5:
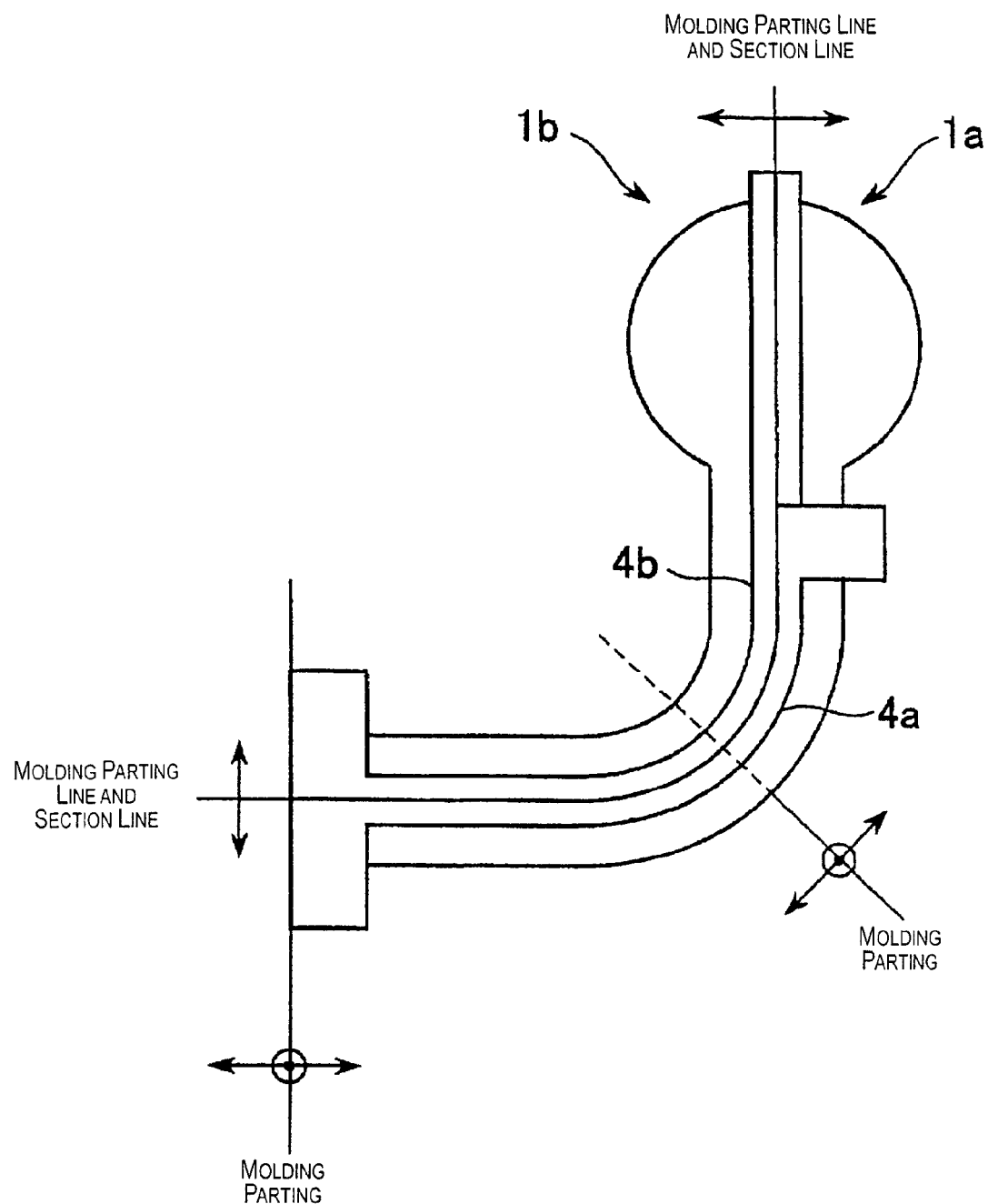
FIG. 5 illustrates the spatial relationships between the sections of the air intake manifold and the mold parting lines in accordance with the first embodiment of the present invention.

FIG. 5 illustrates the relationship between the sections of the air intake manifold 1 and the mold parting lines (i.e., the interface between the main body sections 1a and 1b). The main body sections 1a and 1b divides the air intake manifold 1 into two halves at the division position shown in FIG. 5. Preferably, each of the main body sections 1a and 1b are molded out of resin as a one-piece, unitary member. When the main body sections 1a and 1b are preferably molded as one-piece, unitary members are parted at the positions indicated in FIG. 5. The main body sections 1a and 1b are assembled by welding them together by vibration welding, hot plate welding, ultrasonic welding, or other means such that they are mated tightly together. It is also acceptable to form the air intake manifold 1 of aluminum and, when aluminum casting is used, fix the sections together with bolts.

With this air intake manifold 1, the gas passages 9 can be formed using the mating parts (flange parts 4a and 4b) of the air intake branch pipes 6. As a result, it is not necessary to provide gas passages separately on the outside of the air intake branch pipes 6 and the cost and weight of the air intake manifold can be reduced through reduction of the number of parts. Also, hindering of the arrangement of other parts can be prevented because it is not necessary to provide gas passages separately on the outside of the air intake branch pipes 6.

The gas passages 9 can be formed by making grooves in one or the other of the mating flange parts 4a and 4b or by making grooves in both of the mating flange parts 4a and 4b when the main body sections 1a and 1b. These grooves of the gas passages 9 are formed by die cutting and/or by inserting a gasket 13 in-between the main body sections 1a and 1b when the main body sections 1a and 1b are mated tightly together. Thus, there is no need for machining or the connection of separate members in order to form the gas passages 9 and the manufacturing process is simple.

By introducing the secondary additive gas at the downstream side of each air intake branch pipe 6 in the vicinity of the mounting flange 8, contamination of the air intake passages 11 can be prevented. Moreover, the secondary additive gas can be distributed more evenly to the cylinders, and the control response of the secondary additive gas can be improved. Since the gas passages 9 are formed so as to slant downward and avoid the fuel injection devices 12, water condensation is prevented from collecting inside the gas passages 9.

Second Embodiment

Figure 6:
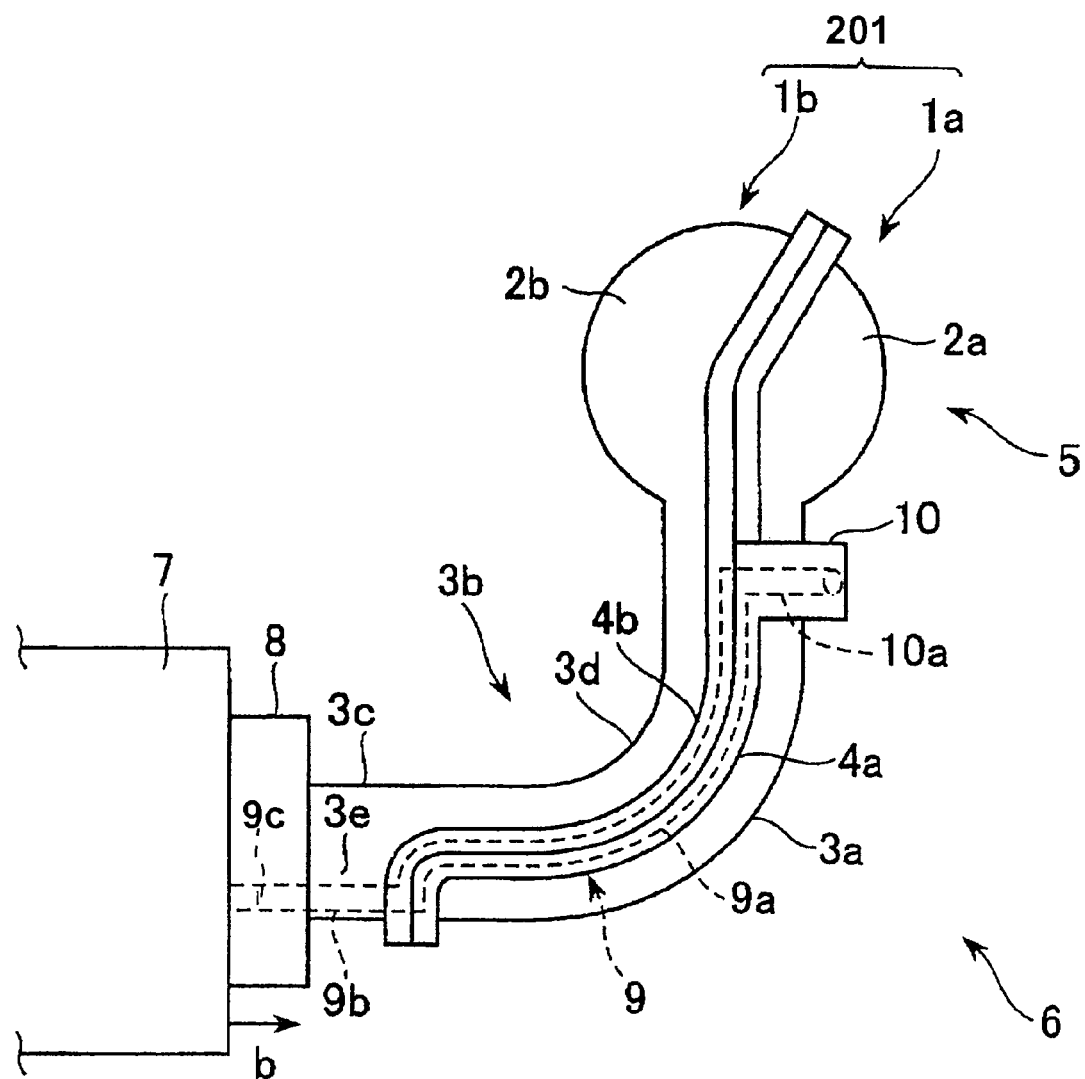
FIG. 6 an end elevational view of an engine air intake manifold in accordance with a second embodiment of the present invention.
Figure 7:
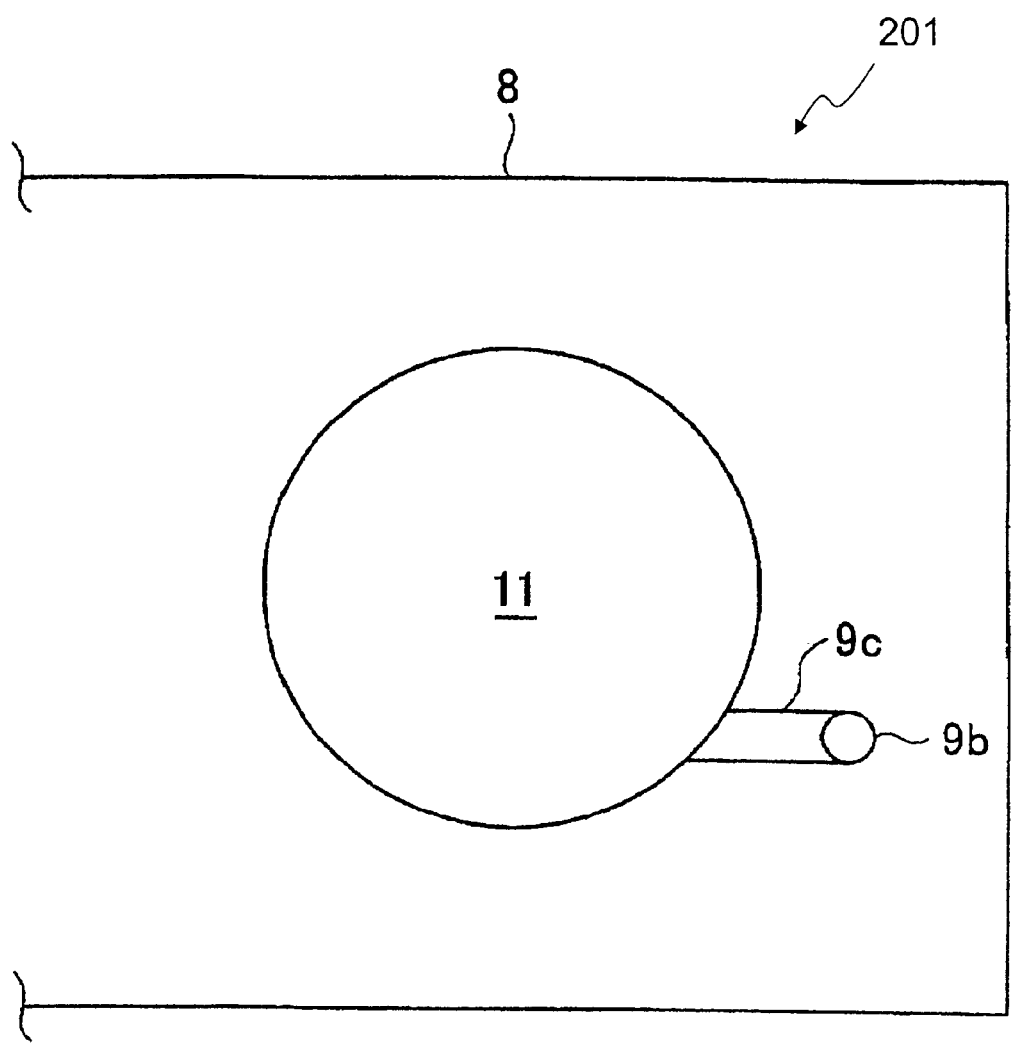
FIG. 7 is a partial enlarged end elevational view of the mounting flange illustrated in FIG. 6 as viewed along the direction of arrow b in FIG. 6.
Figure 8:
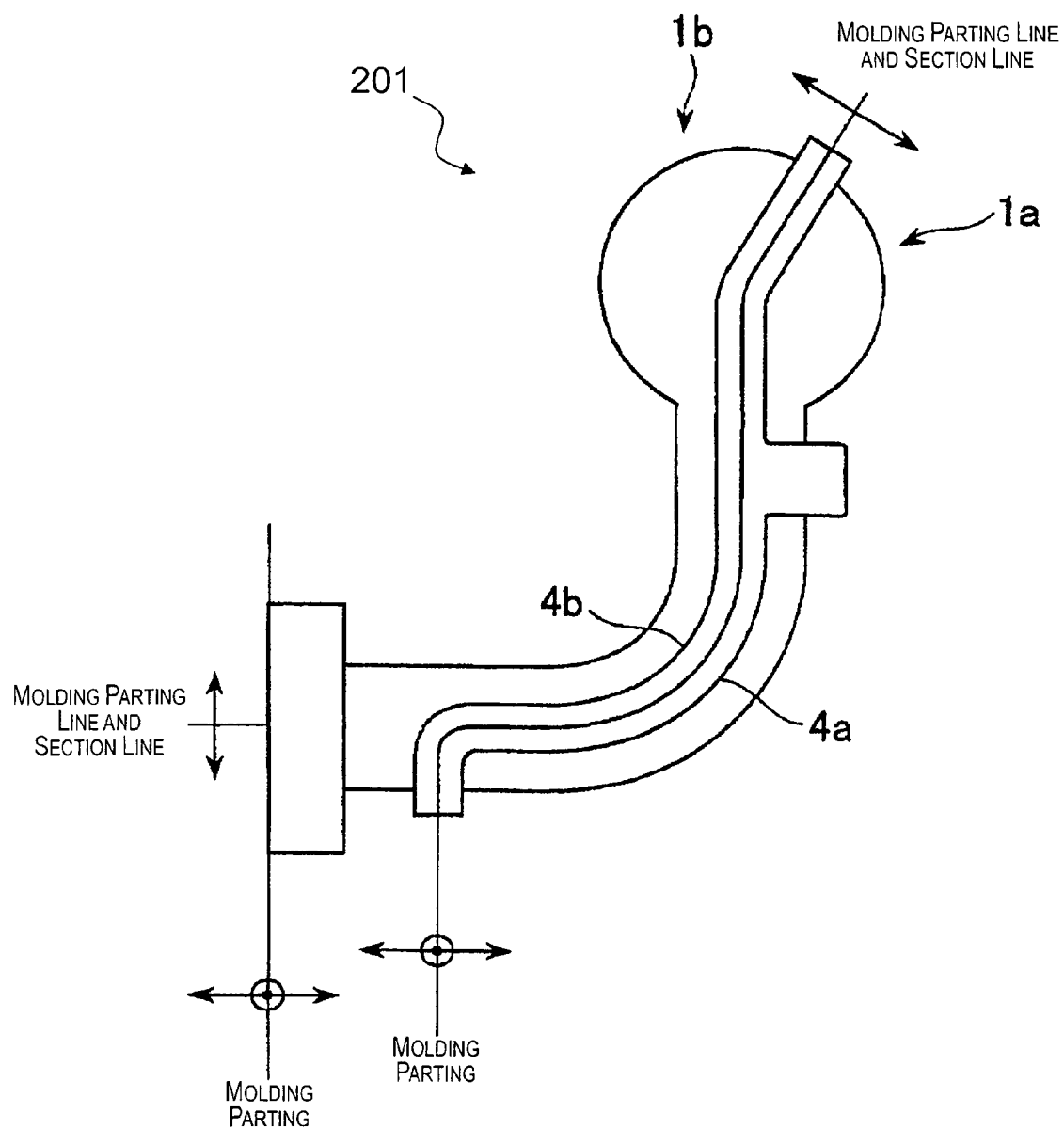
FIG. 8 illustrates the spatial relationships between the sections of the air intake manifold and the mold parting lines in accordance with the second embodiment of the present invention.

Referring now to FIGS. 6–8, an air intake manifold 201 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the air intake manifold 201 is identical to the air intake manifold 1, except that (1) the main body sections 1a and 1b are mated tightly together along a different mating plane which results in a single engine main body mounting flange 8 and a modified gas passage 9, and (2) a fuel injection device 12 has been added for each cylinder. Similarly to the first embodiment, this air intake manifold 201 includes a collector 5, a plurality of air intake branch pipes 6 that branch from the collector 5, and a mounting flange 8 for mounting to an engine main body 7. Similarly to FIG. 1, the air intake passages 11 of the air intake manifold 201 are formed inside the collector 5 and the air intake branch pipes 6. As shown in FIG. 6, the air intake manifold 201 comprises main body sections 1a and 1b that are divided along the direction in which the air flows through the air intake branch pipes 6. While only one of the air intake branch pipes 6 is illustrated in detail herein, it will be apparent from this disclosure that all of the air intake branch pipes 6 have the same structure. 1

The main body section 1a includes a semi-cylindrical air intake passage forming part 2a and a plurality of semi-cylindrical air intake passage forming sections 3a that branch from the air intake passage forming part 2a. A flange part 4a is formed on the main body section 1a along the mating surface.

The main body section 1b includes a semi-cylindrical air intake passage forming part 2b and a plurality of air intake passage forming sections 3b that branch from the air intake passage forming part 2b. The air intake passage forming parts 3b are made up of a cylindrical part 3c and a semi-cylindrical part 3d. A flange part 4b is formed on the air intake passage forming parts 2b and 3b along the mating surface. The cylindrical part 3c is formed integrally with the mounting flange 8 (which mounts to the engine main body 7) and a thick-walled part 3e is formed on a portion of the outside surface of the cylindrical part 3c. The semi-cylindrical part 3d merges uninterruptedly with the cylindrical part 3c and runs in the upstream direction from the upstream end face of the cylindrical part 3c.

The semi-cylindrical air intake passage forming sections 3a are formed to correspond to the mating surfaces of the cylindrical parts 3c and the semi-cylindrical parts 3d of the main body section 1b. The traverse cross section of through the semi-cylindrical parts 3d and the corresponding portion of the semi-cylindrical air intake passage forming sections 3a has the shape shown in FIG. 3(a) or 3(b).

The main body sections 1a and 1b are so configured that when they are mated tightly together at the flange parts 4a and 4b, a plurality of air intake passages 11 are formed inside and gas passages 9 for supplying a secondary additive gas are so formed that a portion thereof follows along the flange parts 4a and 4b. The gas passages 9 are formed in the flange parts 4a and 4b of the air intake branch pipes 6. Each of the gas passages 9 includes a first passage portion 9a, a second passage portion 9b and a third passage portion 9c. The first passage portions 9a are formed in the mating surfaces of the flange parts 4a and 4b with their upstream ends merge with the introducing holes 10a. The second passage portion 9b communicates with the downstream end of the first passage portion 9a and passes through the thick-walled part 3e and the mounting flange 8. The third passage portion 9c communicates between the second passage portion 9b and the air intake passage 11 at the end face of the mounting flange 8 as shown in FIG. 7. The secondary additive gas is introduced from the introducing holes 10a to the upstream ends of the first passages 9a. Thus, the secondary additive gas passes through the first passage portion 9a and the second passage portion 9b to the downstream end face of the mounting flange 8. Then, the secondary additive gas is fed into the air intake passage 11 from the third passage 9c at the downstream end face of the mounting flange 8.

FIG. 8 illustrates the relationship between the sections of the air intake manifold 201 and the mold parting lines. The air intake manifold 201 is divided into main body sections 1a and 1b at the division position shown in FIG. 8. Preferably, each of the main body sections 1a and 1b are molded out of resin. When the main body sections 1a and 1b are molded, the molds are parted at the positions indicated in the same figure.

With this air intake manifold 201, similarly to the first embodiment, the gas passages 9 can be formed by making grooves in one or both of the mating parts when the main body sections 1a and 1b are formed by die cutting and/or by inserting a gasket 13 in-between the main body sections 1a and 1b when the main body sections 1a and 1b are mated tightly together. The second passage 9b and third passage 9c are preferably formed by die cutting. As a result, there is no need for machining or the connection of separate members in order to form the gas passages 9. Since the secondary additive gas is introduced at the end face of the mounting flange 8, similarly to the previous explanation, contamination of the throttle valve can be prevented, contamination of the inside of the air intake passages 11 can be reduced, and the control response of the air-fuel mixture can be improved. Also since the gas passages 9 are formed so as to slant downward and avoid the fuel injection devices 12, water condensation is prevented from collecting inside the gas passages 9.

Third Embodiment

Referring now to FIGS. 9–13, an air intake manifold 301 is illustrated in accordance with a third embodiment of the present invention. In view of the similarity between this embodiment and the prior embodiments, the descriptions of the parts of this embodiment that are identical to the parts of the first embodiment may be omitted for the sake of brevity.

Figure 9:
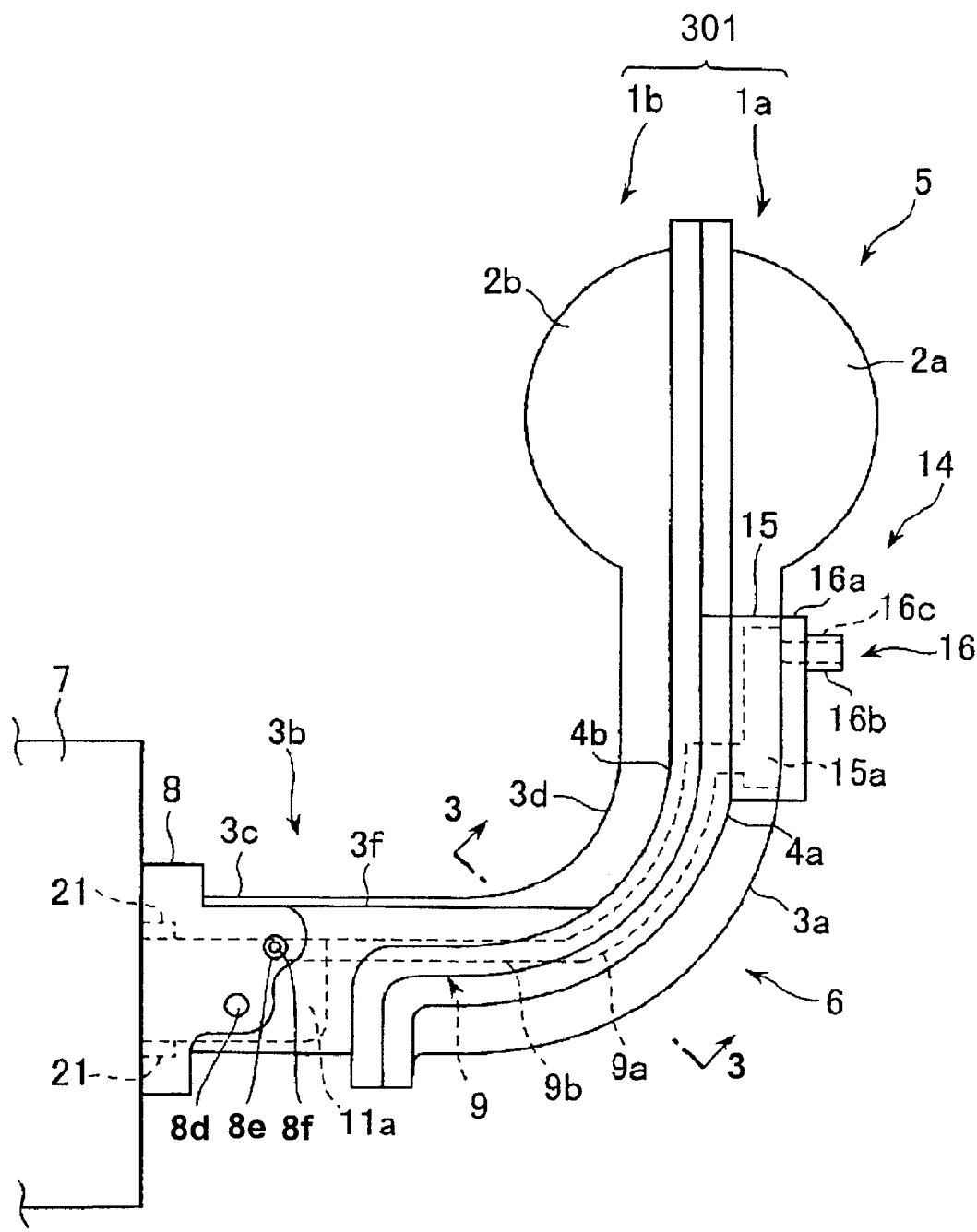
FIG. 9 an end elevational view of an engine air intake manifold in accordance with a third embodiment of the present invention.

Basically, the air intake manifold 301 is identical to the air intake manifold 201, except that (1) the cylindrical part 3c has been modified and (2) the introducing parts 10 have been replaced with a chamber unit 14. Similarly to the first and second embodiments, this air intake manifold 301 includes a collector 5, a plurality of air intake branch pipes 6 that branch from the collector 5, and a mounting flange 8 for mounting to an engine main body 7. Similarly to FIG. 1, air intake passages 11 of the air intake manifold 301 are formed inside the collector 5 and the air intake branch pipes 6. As shown in FIG. 9, the air intake manifold 301 comprises main body sections 1a and 1b that are divided along the direction in which the air flows through the air intake branch pipes 6. The cross section of the air intake branch pipes 6 as viewed along section line 3—3 of FIG. 9 has the same configuration as the first and second embodiments as seen in FIGS. 3(a) and 3(b). While only one of the air intake branch pipes 6 is illustrated in detail herein, it will be apparent from this disclosure that all of the air intake branch pipes 6 have the same structure.

Figure 10:
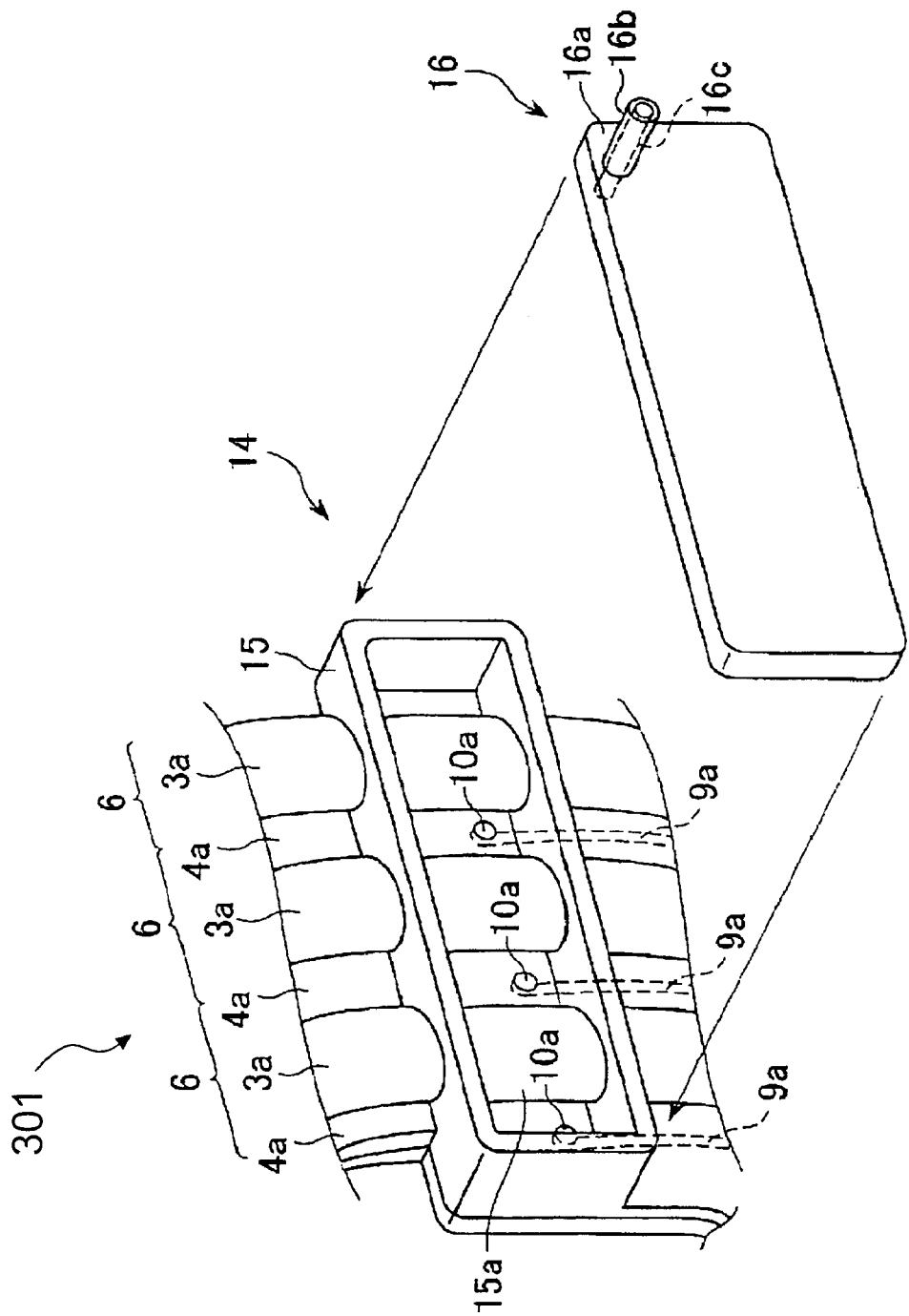
FIG. 10 is an enlarged perspective view of a portion of an engine air intake manifold in the vicinity of the introducing holes in accordance with the third embodiment of the present invention.

FIG. 10 is an enlarged view of the vicinity of the introducing holes 10a in an air intake manifold 301 according to the third embodiment of the present invention. In this embodiment, the flange parts 4a and 4b between adjacent air intake branch pipes 6 are formed as integral units with a chamber unit 14 for introducing a secondary additive gas. The chamber unit 14 is provided on the portion of the air intake passage forming parts 3a that extend vertically when the air intake manifold 301 is mounted to the engine main body 7. In particular, the chamber unit 14 is provided as on the vertically oriented portion of the air intake branch pipes 6 of main body section 1a. The chamber unit 14 communicates with the first passage portions 9a through introducing holes 10a. The chamber unit 14 comprises a frame part 15 and a lid 16 that is mounted to the open side of the frame part 15. The frame part 15 is so formed on the outside surface of the main body section 1a as to traverse the air intake branch pipes 6. The frame part 15 has a space 15a there-within. The frame part 15 is formed integrally as a one-piece, unitary part of the main body section 1a. The main body section 1a has a plurality of air introducing holes 10a opening into the space 15a inside the frame part 15. The lid 16 has a lid main body 16a, an introducing part 16b, and an introducing hole 16c that passes through the introducing part 16b and the lid main body 16a. When the lid 16 is mounted to the frame part 15, the space 15a surrounded by the frame part 15 forms a chamber. The secondary additive gas is first introduced into the chamber (formed by the space 15a) through the introducing hole 16c and then introduced into the introducing holes 10a from the chamber unit 14.

Figure 13:
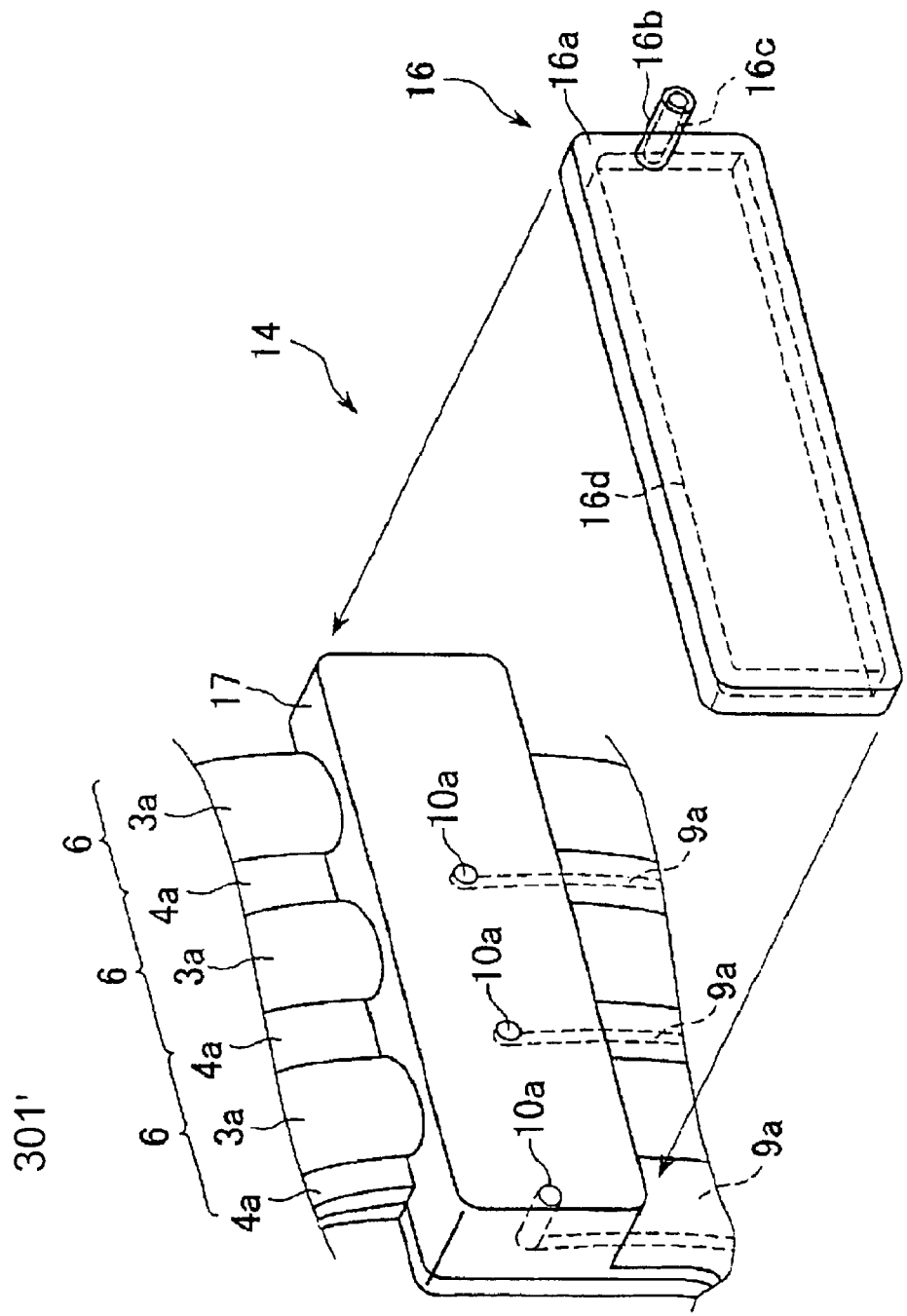
FIG. 13 is an enlarged perspective view of a portion of an engine air intake manifold in the vicinity of the introducing holes in accordance with the third embodiment of the present invention.

Instead of using a frame part 15 having a space 15a, it is also acceptable to form a recessed part 16d in the lid 16 as shown in FIG. 13. In such a case, a flat base part 17 is formed on the outside surface the main body section 1a and the air introducing holes 10a open through a face of the base part 17. The recessed part 16d is provided on the side of the lid 16 that is mounted to the base part 17 and the recessed part 16d communicates with the introducing hole 16c. When the lid 16 is mounted to the base part 17, the recessed part 16d and the base part 17 form a chamber 15a.

In this air intake manifold 301, the chamber unit 14 is formed on the vertically oriented portion of the air intake branch pipes 6. Thus, the chamber can be made long in the vertical direction and a large-volume chamber can be obtained without increasing the size in the horizontal direction. Additionally, a large volume can be secured for the chamber by effectively utilizing the wasted space between the cylindrical air intake branch pipes 6. As a result, the intake pulsation that occurs when the secondary additive gas is drawn into the introducing holes 10a can be reduced and the secondary additive gas can be distributed to the cylinders in a stable manner.

Also, since the secondary additive gas travels downward from the introducing holes 16c to the introducing holes 10a, water condensation can be prevented from collecting in the chamber unit 14. Additionally, the manufacturing process is simple because the frame part 15 can be formed simultaneously with the main body sections 1a and 1b by resin molding.

Figure 12:
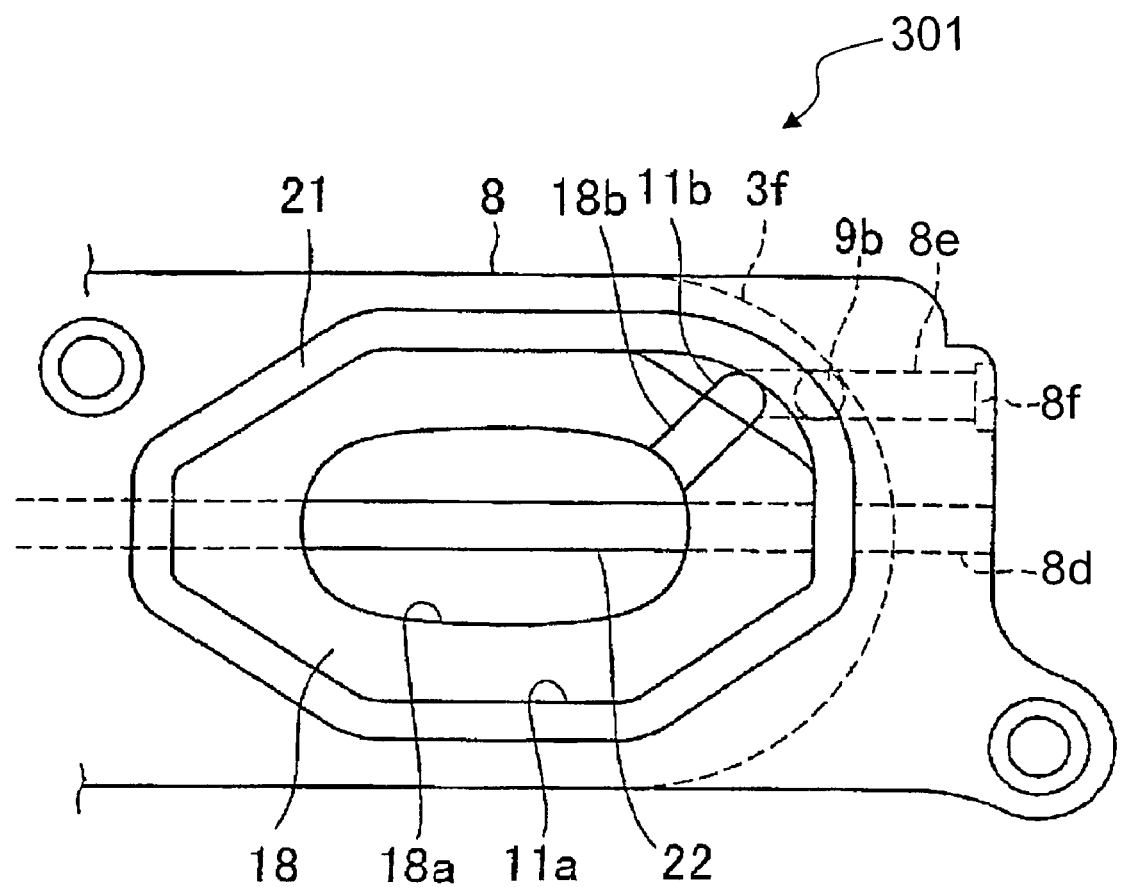
FIG. 12 is a partial enlarged end elevational view, similar to the view of FIG. 11, of the mounting flange of the air intake manifold illustrated in FIG. 9 as viewed from the downstream side in FIG. 9, but with a valve mounting block installed.

As shown in FIG. 9, the mounting flange 8 is so formed on the outside surface of the cylindrical part 3c as to expand in the upstream direction and a thick-walled part 3f is formed between this enlarged portion and the flange part 4b. The thickness of the thick-walled part 3f is thinner than the mounting flange 8 and the flange part 4b relative to the outside surface of the air intake passage forming part 3b, i.e., the cylindrical part 3c and the semi-cylindrical part 3d. In the thick-walled part 3f is formed the second passage portion 9b that merges with the downstream portion of the first passage portion 9a and continues in the downstream direction. The enlarged portion of the mounting flange 8 is provided with a shaft insertion hole 8d and a through hole or third passage portion 8e. The shaft insertion hole 8d passes through the air intake branch pipe 6 corresponding to each cylinder as shown in FIG. 12. A shaft 22 is inserted into the shaft insertion hole 8d with air intake control valves fixedly mounted to the shaft 22 after the valve mounting blocks 18 are installed. The enlarged portion of the mounting flange 8 is provided with the third passage portion 8b to enable the second passage portion 9b to communicate with the recessed part 11a. The third passage portion 8b is formed by machining and passes from the outside surface to the inside surface of the enlarged portion of the mounted flange 8. An insertion hole 8f for inserting a blind plug or stopper is formed at the outside-surface opening portion of the third passage portion 8e so that the third passage portion 8e can be blocked by attaching a lid with an adhesive or press-fitting a blind plug or stopper after it is formed by machining.

Figure 11:
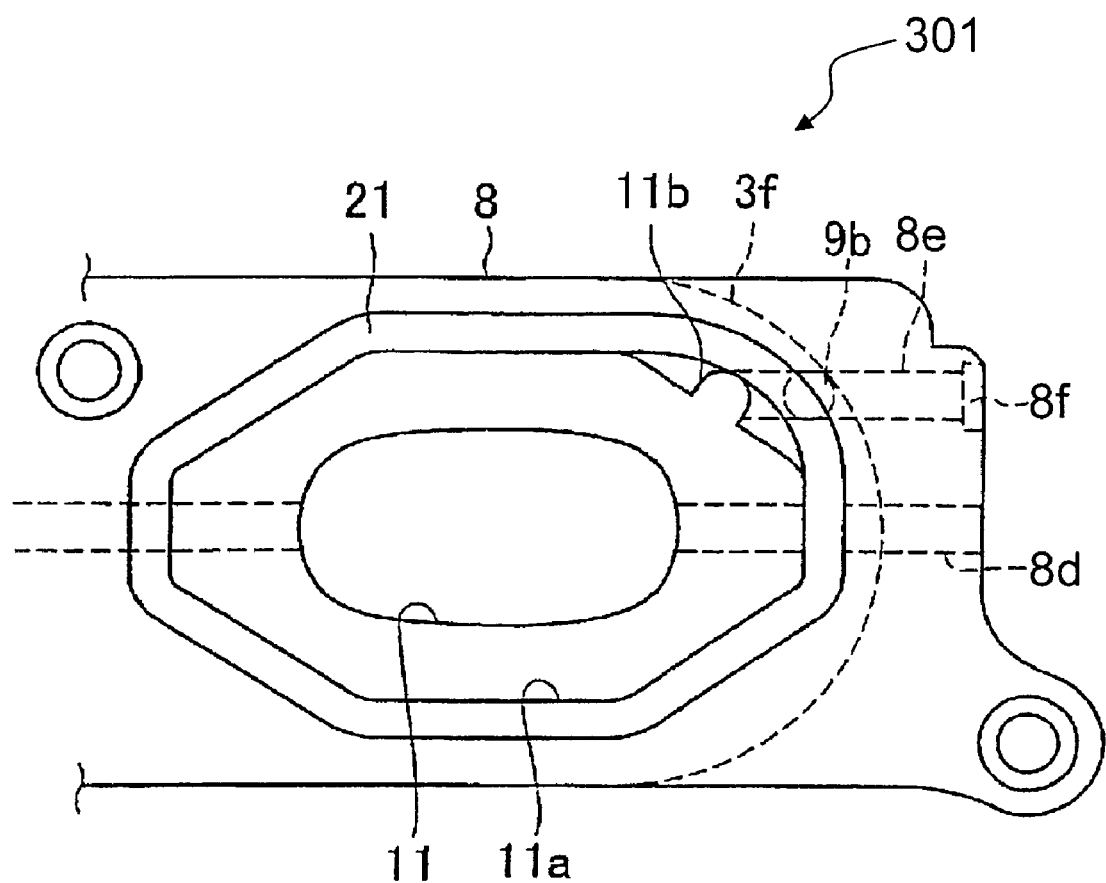
FIG. 11 is a partial enlarged end elevational view of the mounting flange of the air intake manifold illustrated in FIG. 12 as viewed from the downstream side in FIG. 9 in accordance with the third embodiment of the present invention.

Referring now to FIGS. 9, 11 and 12, in this embodiment, a valve mounting block 18 is installed in a recessed part 11a formed in the downstream end of each air intake branch pipe 6 and a groove 18b forming a fourth passage portion that serves as a portion of the gas passage 9 (through which a secondary additive gas flows) is so formed in the mating surfaces of each recessed part 11a and valve mounting block 18 as to be oriented in the direction in which the intake air flows. FIG. 9 is an end view of the downstream portion of an air intake manifold 301, while FIG. 11 shows an air intake branch pipe 6 and the mounting flange 8 viewed from the downstream side thereof prior to installation of the valve mounting block 18 in the recessed part 11a. FIG. 12 shows the same view as FIG. 11 but with the valve mounting block 18 installed in the recessed part 11a.

As shown in FIG. 11, the recessed part 11a that merges with the air intake passage 11 is formed in the downstream end face of each air intake branch pipe 6. The valve mounting block 18, as shown in FIG. 12, is inserted into the recessed part 11a. The recessed part 11a that merges with the downstream portion of the air intake passage 11. The recessed part 11a has larger cross-sectional size than the air intake passage 11 is formed in the downstream end face of each air intake branch pipe 6. The recessed part 11a has the shape of an octagon in the cross sectional view, while the groove 11b oriented along the flow direction of the air is formed in one side of the octagon. When the mounting block 18 is inserted into the recessed part 11a, the groove 11b and the outside surface of the mounting block 18 form a fourth passage portion as shown in FIG. 12.

When the valve mounting block 18 is inserted into the recessed part 11a, the groove 11b forms the fourth passage portion. The valve mounting block 18 has an air intake passage 18a inside with the air intake passage 18a communicating with the air intake passage 11 when the valve mounting block 18 is installed in the recessed part 11a. A groove 18b is formed in the downstream end face of the valve mounting block 18. Thus, the groove 18b together with the end surface of the engine block 7 forms a fifth passage portion for supplying the secondary additive gas from the groove 11b (the fourth passage portion) to the air intake passage 18a. In other words, the groove 18b (the fifth passage portion) communicates between the groove 11b (the fourth passage portion) and the air intake passage 18a. A gasket installation groove 21 is provided in the downstream end face of the mounting flange 8 around the opening of the recessed part 11a. A gasket installation groove 21 is provided in the downstream end face of the mounting flange 8 around the opening of the recessed part 11a. The groove 21 is widened in the vicinity of the groove 11b so as to avoid the groove 11b.

In an air intake manifold 301 configured in any of the manners just described, the secondary additive gas is first introduced into the chamber 15a or 16d through the introducing hole 16c and then directed into the first passage portions 9a through the introducing holes 10a. Then the secondary additive gas is fed downstream through the first passage portions 9a and the second passage portions 9b. The secondary additive gas then passes through the third passage portions 8b and into the fourth passage portions 11b, which is formed in the mating surfaces of the recessed part 1a and the valve mounting block 18. From there, the secondary additive gas is fed into the air intake passage 18a from the groove 18b (the fifth passage portion) at the downstream end face of the valve mounting block 18.

With this air intake manifold 301, when the valve mounting block 18 is installed in the downstream end face of the air intake branch pipe 6, the fourth passage portion formed by the groove 11b can be formed using the mating surfaces of the valve mounting block 18 and the recessed part 11a. As a result, the secondary additive gas can be directed to the downstream side of the valve mounting block 18 and contamination of the valve by the secondary additive gas can be prevented.

Since the introduction of the secondary additive gas to the fourth passage portion formed by groove 11b is accomplished by forming the through hole 8b from the outside so that the fourth passage portion formed by the groove 11b communicates with the second passage portion 9b, the secondary additive gas can be directed to the fourth passage portion formed by the groove 11b by executing a simple machining operation.

In this air intake manifold 301, when the mounting block 18 for mounting air intake control valves is inserted into a downstream portion of the air intake branch pipes 6, at least a portion (fourth passage portion) of the gas passage configured to supply blow-by gas into the intake air flowing through the air intake branch pipes 6 is formed in the mating surfaces of the air intake branch pipes 6 and the mounting block 18. Consequently, the blow-by gas can be directed to the downstream side of the air intake control valve without greatly enlarging the mounting flange 8. Additionally, since the fourth passage portion formed by the groove 11b is formed using the mating surfaces of the mounting block 18 and the recessed part 11a, the opening of the fourth passage portion formed by the groove 11b can be formed closely adjacent to the recessed part 1a and expansion of the area sealed by gasket can be suppressed.

In this air intake manifold 301, the chamber unit 14 is formed on the vertically oriented portion of the air intake branch pipes 6. Thus, the chamber unit 14 can be made long in the vertical direction and a large-volume chamber can be obtained without increasing the size in the horizontal direction. Additionally, a large volume can be secured for the chamber by effectively utilizing the wasted space between the cylindrical air intake branch pipes. As a result, the intake pulsation that occurs when the blow-by gas is drawn into the introducing holes 10a can be reduced and the blow-by gas can be distributed to the cylinders in a stable manner. Also, since the blow-by gas travels downward from the introducing holes 16c to the introducing holes 10a, water condensation can be prevented from collecting in the chamber. Additionally, the manufacturing process is simple because the frame part 15 or base part 17 can be formed simultaneously with the main body sections 1a and 1b by resin molding.

Referring now to FIG. 13, an enlarged partial side view of an air intake manifold 301' is illustrated in accordance with this embodiment of the present invention. In this modified embodiment, the flange parts 4a and 4b between adjacent air intake branch pipes 6 are formed as integral units and a chamber unit 14 for introducing a secondary additive gas is provided on the portions of the air intake passage forming parts 3a that extend vertically. However, in this embodiment, the lid 16 has a recessed part 16d. The chamber unit 14 comprises a base part 17 that is so formed as to traverse the air intake branch pipes 6 and a lid 16 that has a recessed part 16d. The lid 16 is fixedly mounted to the base part 17. A plurality of introducing holes 10a open to a face of the base part 17. The lid 16 includes a lid main body 16a in which the recessed part 16d is formed, an introducing part 16b, and an introducing hole 16c that passes through the introducing part 16b and opens into the recessed part 16d. When the lid 16 is mounted to the base part 17, the recessed part 16d forms a chamber. The secondary additive gas is first introduced into the chamber (formed by the recessed part 16d) through the introducing hole 16c and then introduced into the introducing holes 10a from the chamber.

In this air intake manifold 301', since the chamber unit 14 is formed on the vertically oriented portion of the air intake branch pipes 6, the chamber can be made long in the vertical direction and a large-volume chamber can be obtained. As a result, the intake pulsation that occurs when the secondary additive gas is drawn into the introducing holes 10a can be reduced and the secondary additive gas can be distributed to the cylinders in a stable manner.

Fourth Embodiment

Figure 14:
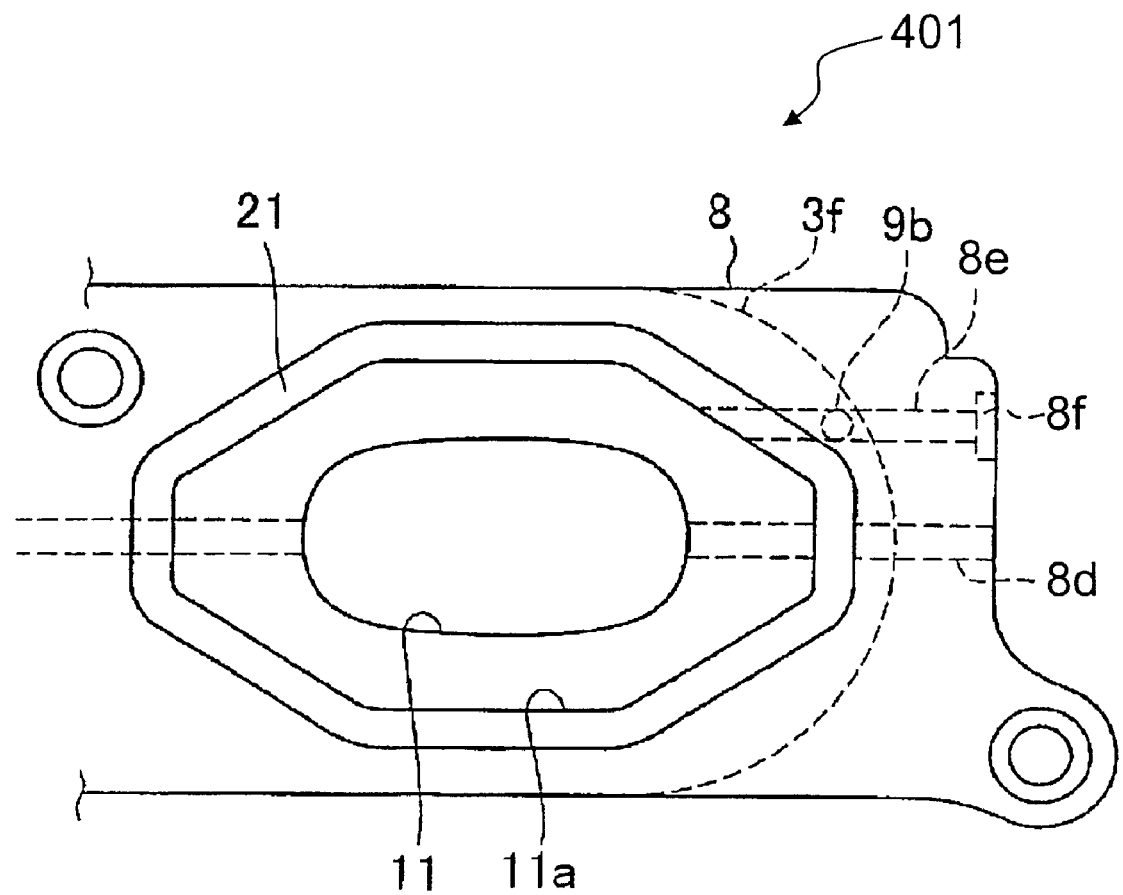
FIG. 14 is a partial enlarged end elevational view, similar to the view of FIG. 11, of the mounting flange of the air intake manifold illustrated in FIG. 9 as viewed from the downstream side in FIG. 9, but where a groove is provided in the inside surface of the air intake branch pipe in accordance with a fourth embodiment of the present invention.
Figure 15:
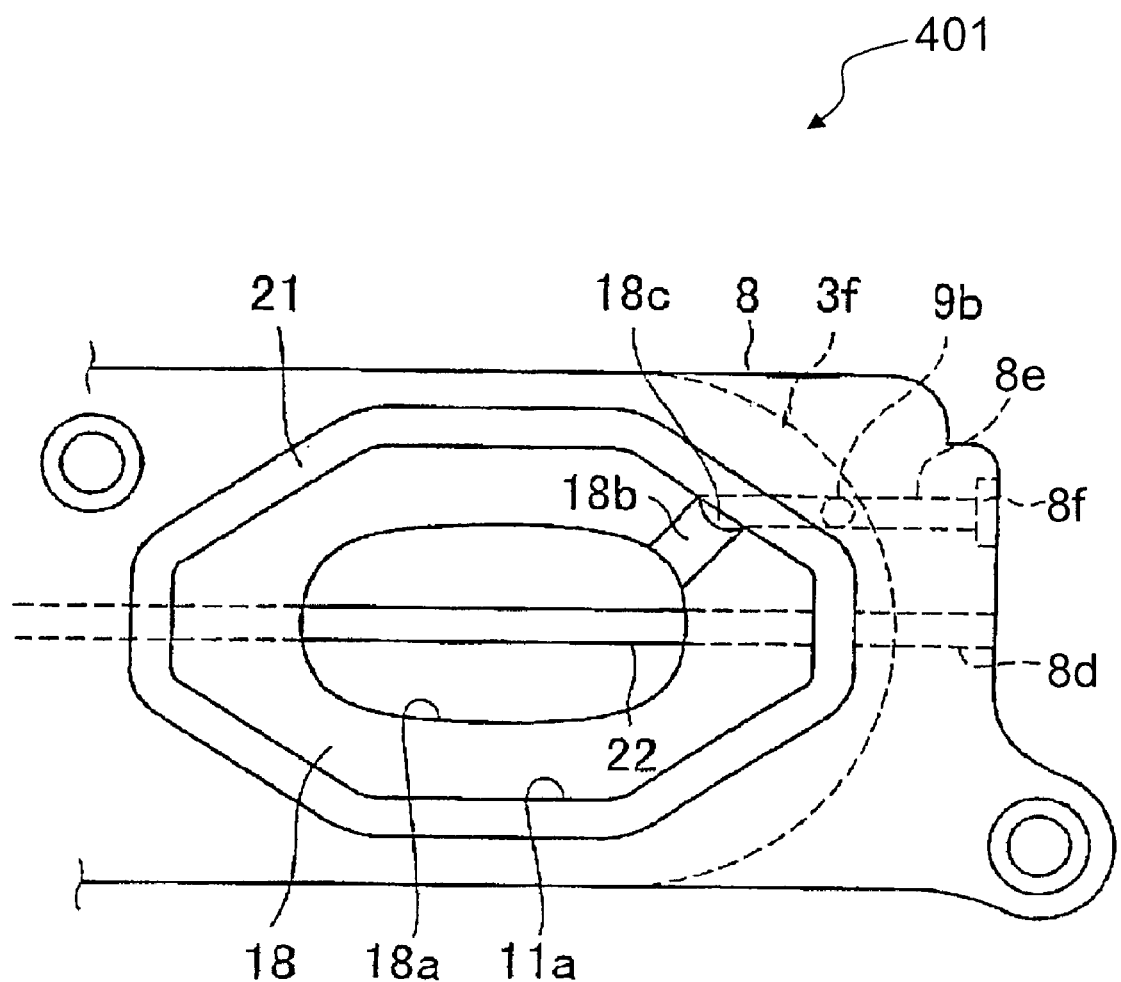
FIG. 15 is a partial enlarged end elevational view, similar to the view of FIG. 14, of the mounting flange of the air intake manifold as viewed from the downstream side, but with a valve mounting block installed.

Referring now to FIGS. 14 and 15, portions of an air intake manifold 401 are illustrated in accordance with a fourth embodiment of the present invention. Basically, the air intake manifold 401 is identical to the air intake manifold 301 using either the chamber unit of FIG. 13 or 14, except that the end face of the cylindrical part 3c has been modified. In view of the similarity between this embodiment and the prior embodiments, the descriptions of the parts of this embodiment that are identical to the parts of the first embodiment may be omitted for the sake of brevity. FIG. 14 shows an air intake branch pipe 6 and the mounting flange 8 viewed from the downstream side thereof. FIG. 15 shows the same view as FIG. 14 but with a valve mounting block 18 installed. While only the end of one of the air intake branch pipes 6 is illustrated in detail herein, it will be apparent from this disclosure that all of the air intake branch pipes 6 have the same structure.

While in the third embodiment the fourth passage portion is formed by a groove 11b formed in the recessed part 11a of the branch pipes 6 and the outside wall of the valve mounting block 18, in this embodiment a groove 18c is formed in the outside wall of the valve mounting block 18. Since the groove 11b is not formed in the inside wall of the recessed 11a, the gasket installation groove 21 can be formed along the outside shape of the valve mounting block 18. Thus, by forming the gasket installation groove 21 along the outside shape of the valve mounting block 18, the secondary additive gas can be sealed more securely when the air intake manifold is mounted to the engine main body 7.

Also, as shown in FIG. 15, the groove 18c that merges with the groove 18b is formed in alignment with the airflow in the outside surface of the air intake control valve mounting block 18. When the mounting block 18 is inserted into the recessed part 11a, the groove 18c of the mounting block 18 and the inside surface of the recessed part 11a form the fourth passage portion. Since the fourth passage portion is formed inside the recessed part 11a, the gasket installation groove 21 does not need to be widened beyond the perimeter of the opening of the recessed part 11a. As a result, the area sealed by the gasket can be made smaller and the sealing quality can be improved.

It is also acceptable to provide the groove 11b in the inside surface of the recessed part 11a of the air intake branch pipe 6 and the groove 18c in the outside surface of the mounting block 18 so that the fourth passage portion is formed by both the groove 11a and the groove 18c.

When the fourth passage portion is provided by forming the groove 18c in the outside surface of the mounting block 18, the fourth passage portion formed by the groove 18c can be connected to the first passage portion 9a in the same manner as just described in the third embodiment. Also, instead of providing the chamber unit 14 of FIG. 10 or 13 at the upstream end of the first passage portions 9a as in the third embodiment, it is also acceptable to provide the introducing parts 10 similarly to the first embodiment.

Fifth Embodiment

Figure 16:
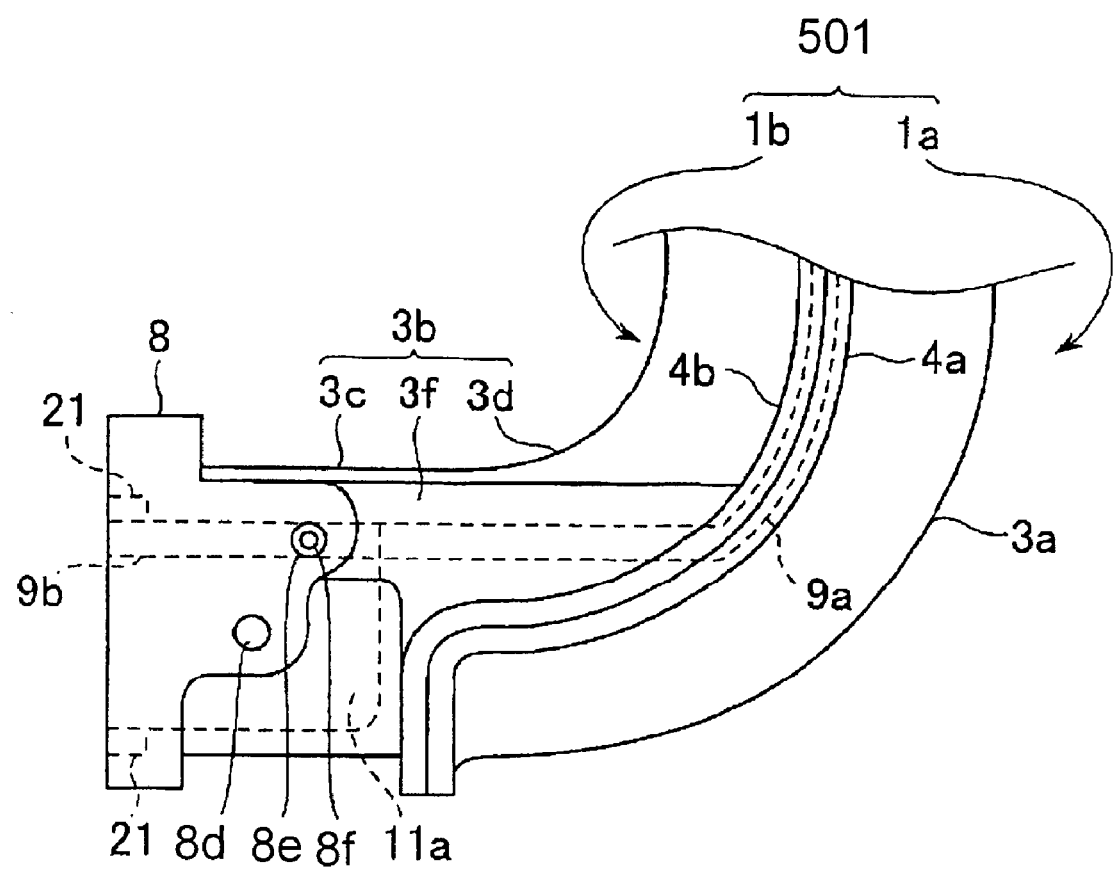
FIG. 16 is side view of the downstream portion of an air intake manifold in accordance with a fifth embodiment of the present invention.
Figure 17:
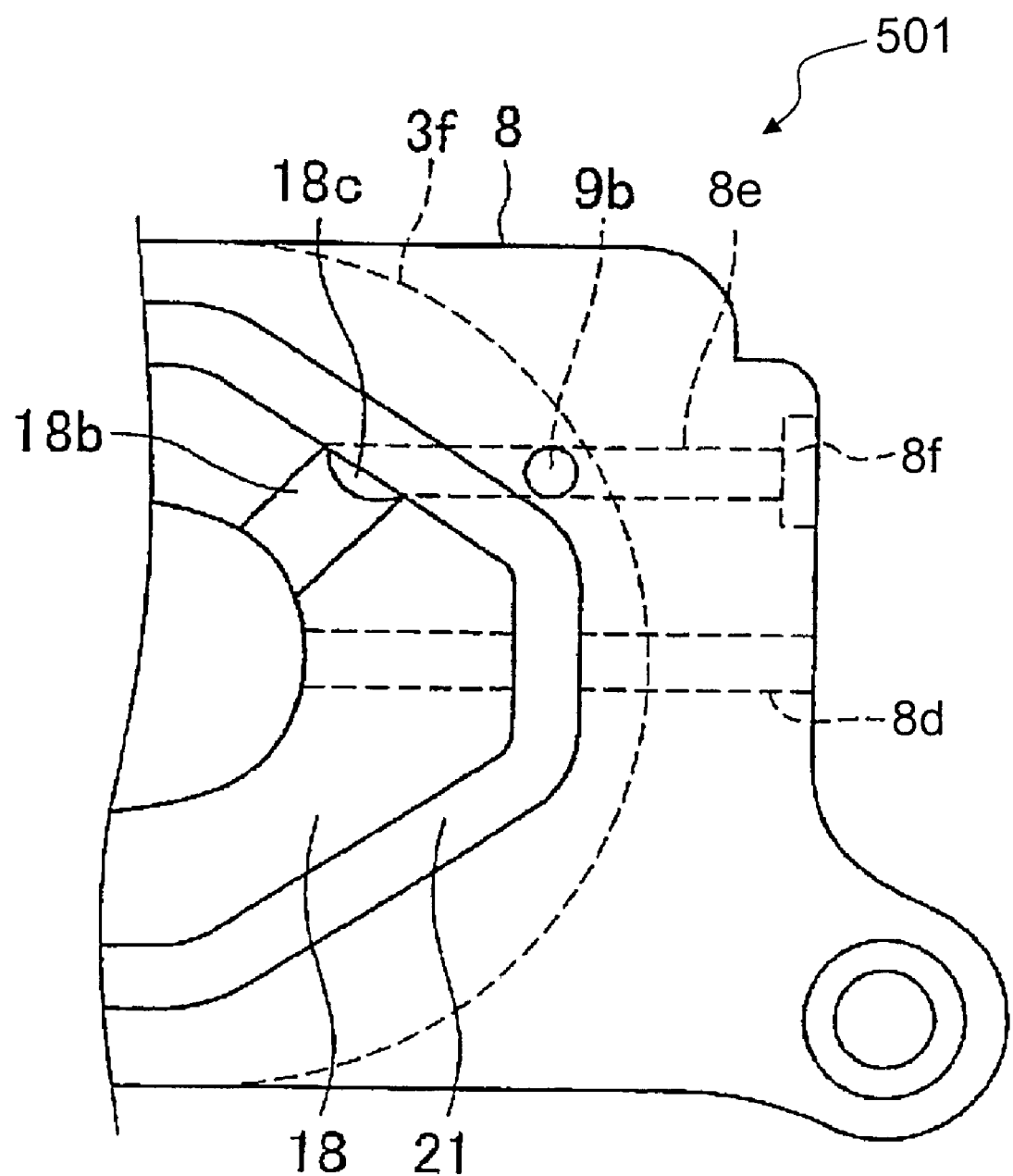
FIG. 17 is a partial enlarged end elevational view of the mounting flange of the air intake manifold as viewed from the downstream side in accordance with the fifth embodiment of the present invention.

Referring now to FIGS. 16 and 17, portions of an air intake manifold 501 is illustrated in accordance with a fifth embodiment of the present invention. Basically, the air intake manifold 501 is identical to the air intake manifold 301 using either the chamber unit of FIG. 13 or 14, except that the end face of the cylindrical part 3c has been modified. In view of the similarity between this embodiment and the prior embodiments, the descriptions of the parts of this embodiment that are identical to the parts of the first embodiment may be omitted for the sake of brevity. FIG. 16 is side view of the downstream portion of an air intake manifold 501 in accordance with an eighth embodiment of the present invention. FIG. 17 shows an air intake branch pipe 6 and the mounting flange 8 viewed from the downstream side thereof. While only one of the air intake branch pipes 6 is illustrated in detail herein, it will be apparent from this disclosure that all of the air intake branch pipes 6 have the same structure.

As shown in FIG. 16, an air intake manifold 501 in accordance with this embodiment features a second passage portion 9b that is machined from the downstream end face of the mounting flange 8 to the flange part 4b. This approach can be used when the second passage portion 9b cannot be die cut from the flange part 4b side when the main body section 1b is resin molded. As shown in FIG. 17, since the downstream opening of the second passage portion 9b is located to the outside of the gasket installation groove 21, a lid is attached to the opening with an adhesive or a blind plug, ball, or the like is press fitted or bonded with an adhesive into the opening in order to prevent the secondary additive gas from leaking out.

Sixth Embodiment

Figure 18:
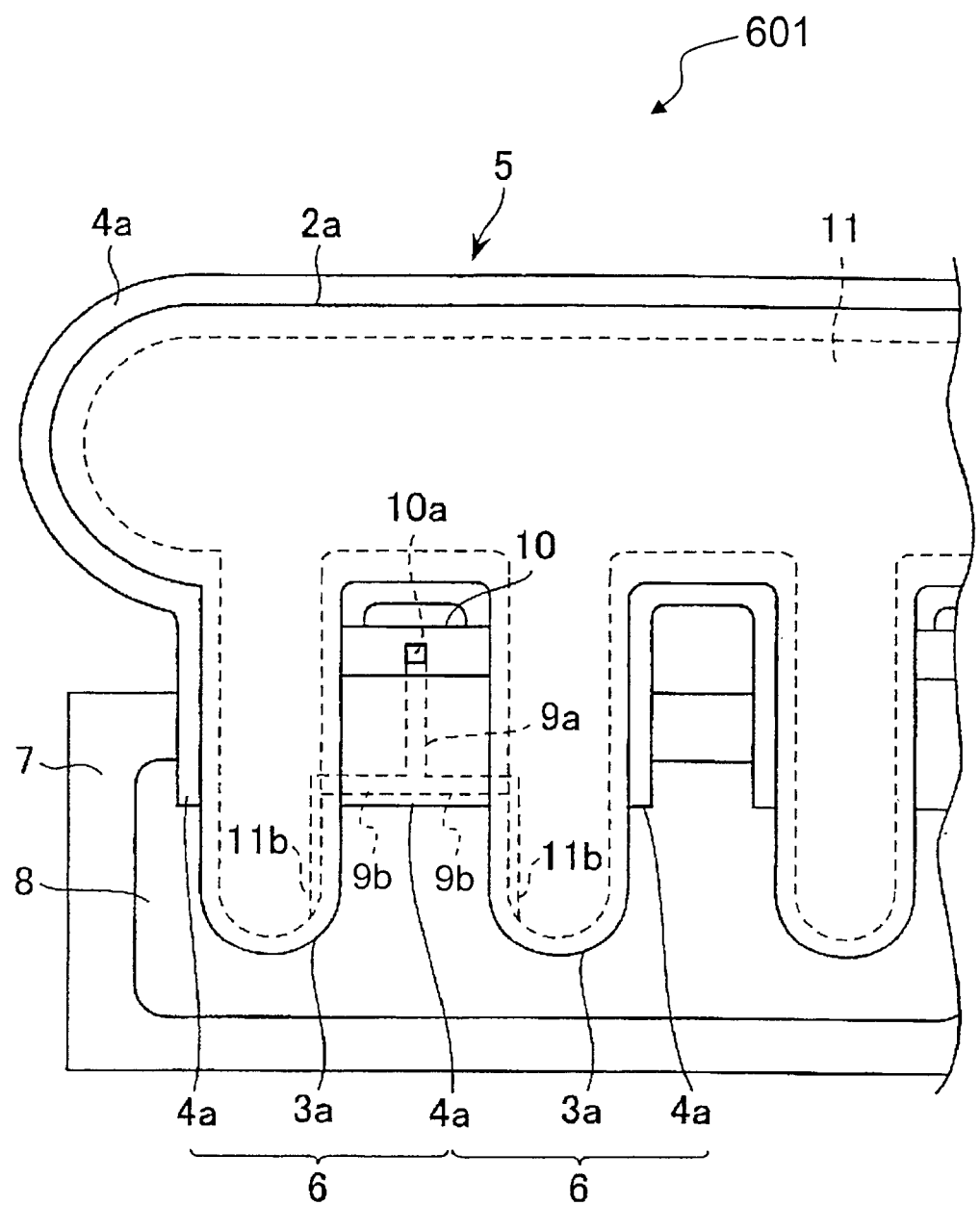
FIG. 18 is side elevational view of an engine air intake manifold in accordance with a sixth embodiment of the present invention.
Figure 19:
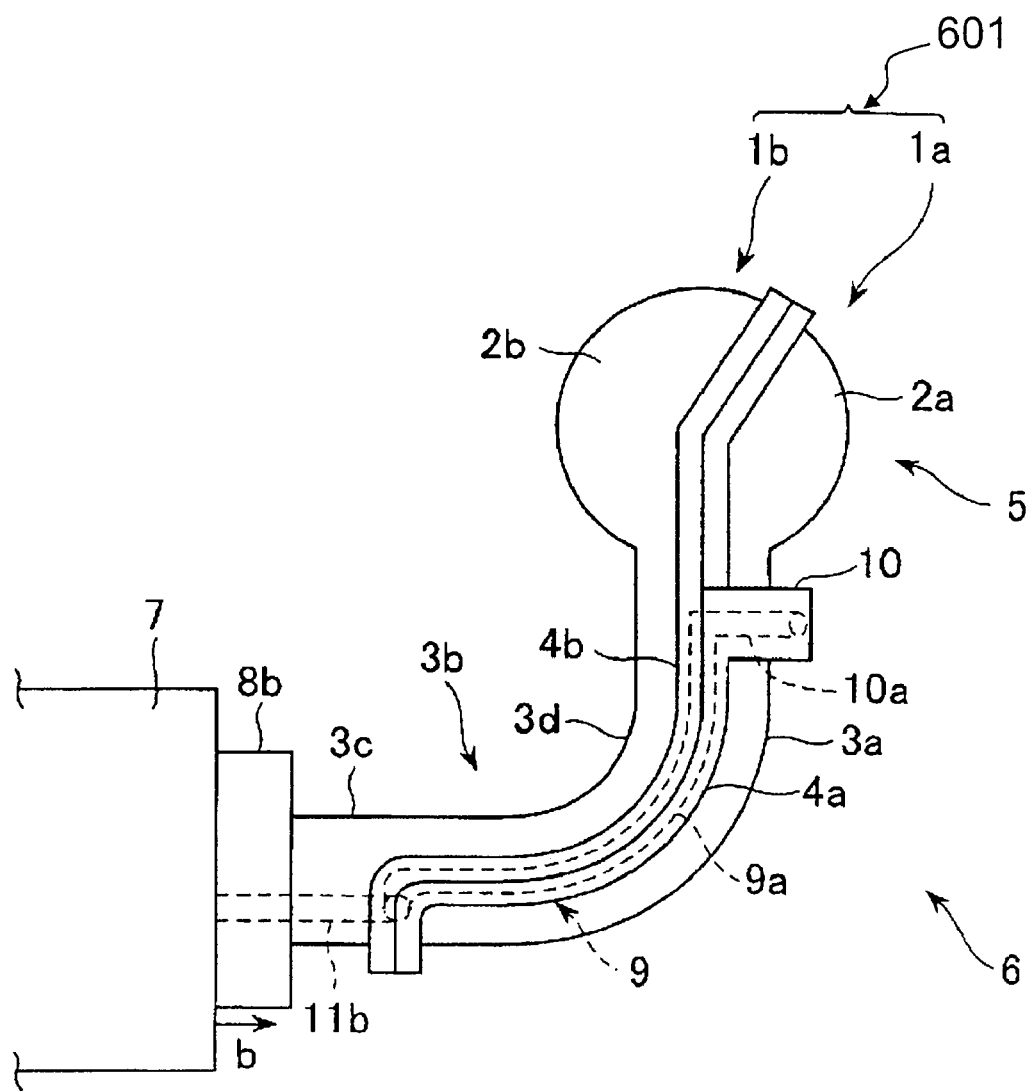
FIG. 19 an end elevational view of the engine air intake manifold illustrated in FIG. 18 in accordance with the sixth embodiment of the present invention.
Figure 20:
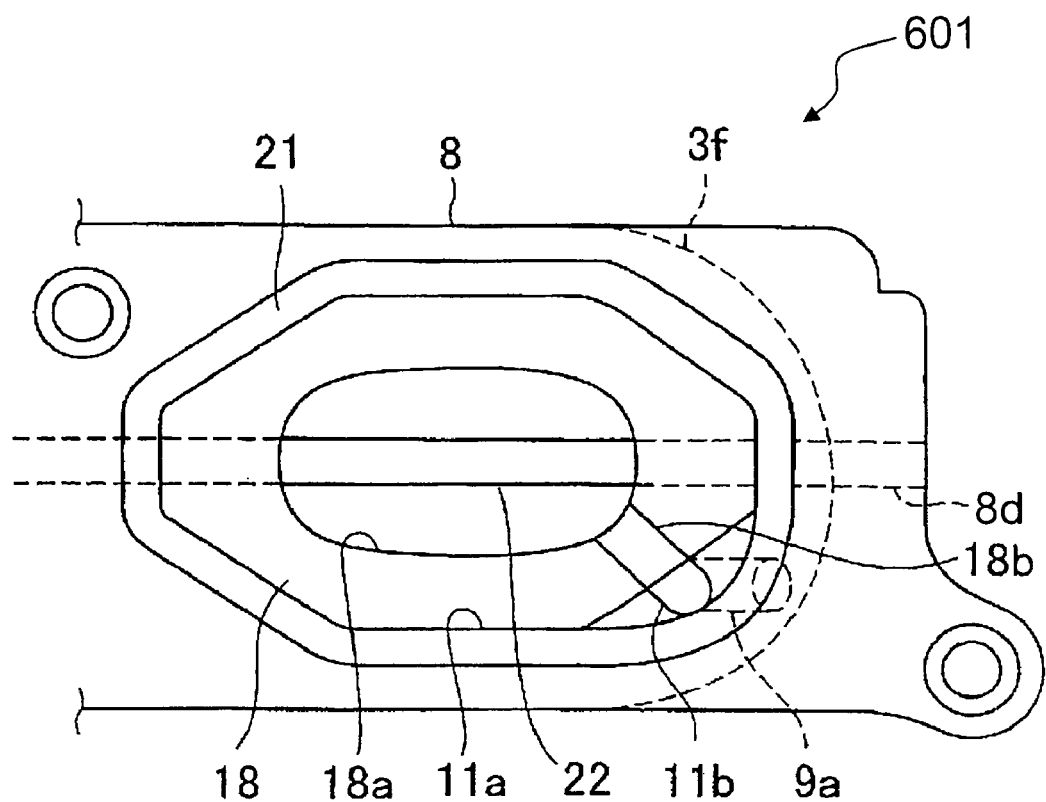
FIG. 20 is a partial enlarged end elevational view of the mounting flange of the air intake manifold illustrated in FIGS. 18 and 19 as viewed from the downstream side in FIG. 19, with a valve mounting block installed.

Referring now to FIGS. 18–20, a partial side view of an air intake manifold 601 is illustrated in accordance with a sixth embodiment of the present invention. Basically, the air intake manifold 601 is identical to the air intake manifold 201, except that the gas passage 9 has been modified. In view of the similarity between this embodiment and the prior embodiments, the descriptions of the parts of this embodiment that are identical to the parts of the first embodiment may be omitted for the sake of brevity.

As best seen in FIG. 18, this air intake manifold 1 is the same as the air intake manifold 1 of the first embodiment but with the additional requirement that the flange parts 4a and 4b between at least one pair of adjacent air intake branch pipes 6 be formed integrally with each other. While only one of the adjacent pairs of the air intake branch pipes 6 is illustrated in detail herein, it will be apparent from this disclosure that all of the adjacent pairs of the air intake branch pipes 6 have the same structure. When the engine has an even number of cylinders, e.g., four, it is also acceptable for the flange parts 4a and 4b between all adjacent pairs of the air intake branch pipes 6 to be formed integrally with one another or for the flange parts 4a and 4b between a portion of adjacent pairs of the air intake flange pipes 6 to be formed integrally with one another.

In the integrally formed flange parts 4a and 4b are formed the gas passages 9 that serve to supply a secondary additive gas to the air intake passages 11 of adjacent pair of the air intake branch pipes 6. The gas passages 9 each have a first passage portion 9a and a pair of second passage portions 9b. The second passage portions 9b are connected to a pair of fourth intake air passage portions 11b of an adjacent pair of the air intake branch pipes 6 such that the secondary additive gas is delivered from each first passage portion 9a to the fourth passage portions 11b of the air intake branch pipes 6. In such a case, the secondary additive gas can be supplied to both fourth passage portions 11b of adjacent air intake branch pipes 6 using a common one of the first passage portion 9a.

Similarly to the first passage portion 9a in the first embodiment, these first passage portions 9a communicate at their upstream ends with the introducing holes 10a and are formed in the mating faces of the flange parts 4a and 4b. The second passages 9b branch in both directions from a corresponding one of the first passage 9a in the vicinity of the mounting flange 8 and communicates with the air intake passages 11 of the air intake branch pipes 6 on both sides via the fourth passage portions 11b. The secondary additive gas is introduced into the upstream side of the first passage portions 9a from the introducing holes 10a, branches into the second passage portions 9b, and is fed into the air intake passages 11 of adjacent pairs of the air intake branch pipes 6.

In this air intake manifold 601, the secondary additive gas can be supplied to the air intake passages 11 using the gas passages 9 that are common to adjacent pairs of the air intake branch pipes 6. As a result, the air intake manifold 601 can be reduced in size compared to a case in which the flange parts 4a and 4b are made wider and the gas passage 9 is formed with respect to each of the air intake branch pipes 6.

Referring now to FIGS. 19 and 20, FIG. 19 is a side view of an air intake manifold 601 in accordance with the sixth embodiment of the present invention, while FIG. 20 shows the mounting flange 8 viewed from the downstream side thereof of FIG. 19. In this air intake manifold 601, the groove 11b (fourth passage portion) is extends to the bottom of the recessed part 1a as shown in FIG. 20, while the groove 18b (fifth passage portion) is formed in the bottom of the mounting block 18. The grooves 11b and 18b are arranged so that the grooves 11b and 18b communicate with each other. Also, the downstream portion of the first passage portion 9a, which is formed in the mating surfaces of the flanges 4a and 4b, passes toward the recessed part 111a and communicates with the fourth passage portion 11b. At the upstream end of the first passage portion 9a of each air intake branch pipe 6 is an introducing part 10 and each introducing part 10 has an introducing hole 10a that communicates with the upstream end of the first passage portion 9a. The secondary additive gas is introduced into the first passage portions 9a from the introducing holes 10a, travels downstream through the fourth passage portion 11b and the fifth passage portion 18b, and is delivered into the air intake passage 18a.

With this air intake manifold 601, the secondary additive gas can be introduced directly into the fourth passage portion formed by the groove 11b in the mating surfaces of the recessed part 11a and the mounting block 18 from the first passage portion 9a formed in the mating surfaces of the flange parts 4a and 4b. Consequently, it is not necessary to machine additional passages in order to deliver the blow-by gas to the fourth passage portion formed by the groove 11b.

If the main body sections 1a and 1b are made of molded resin or cast aluminum as just described, the first passage portion 9a can be formed in the flange parts 4a and 4b simultaneously with the molding or casting, making formation of the gas passage simple.

Seventh Embodiment

Figure 21:
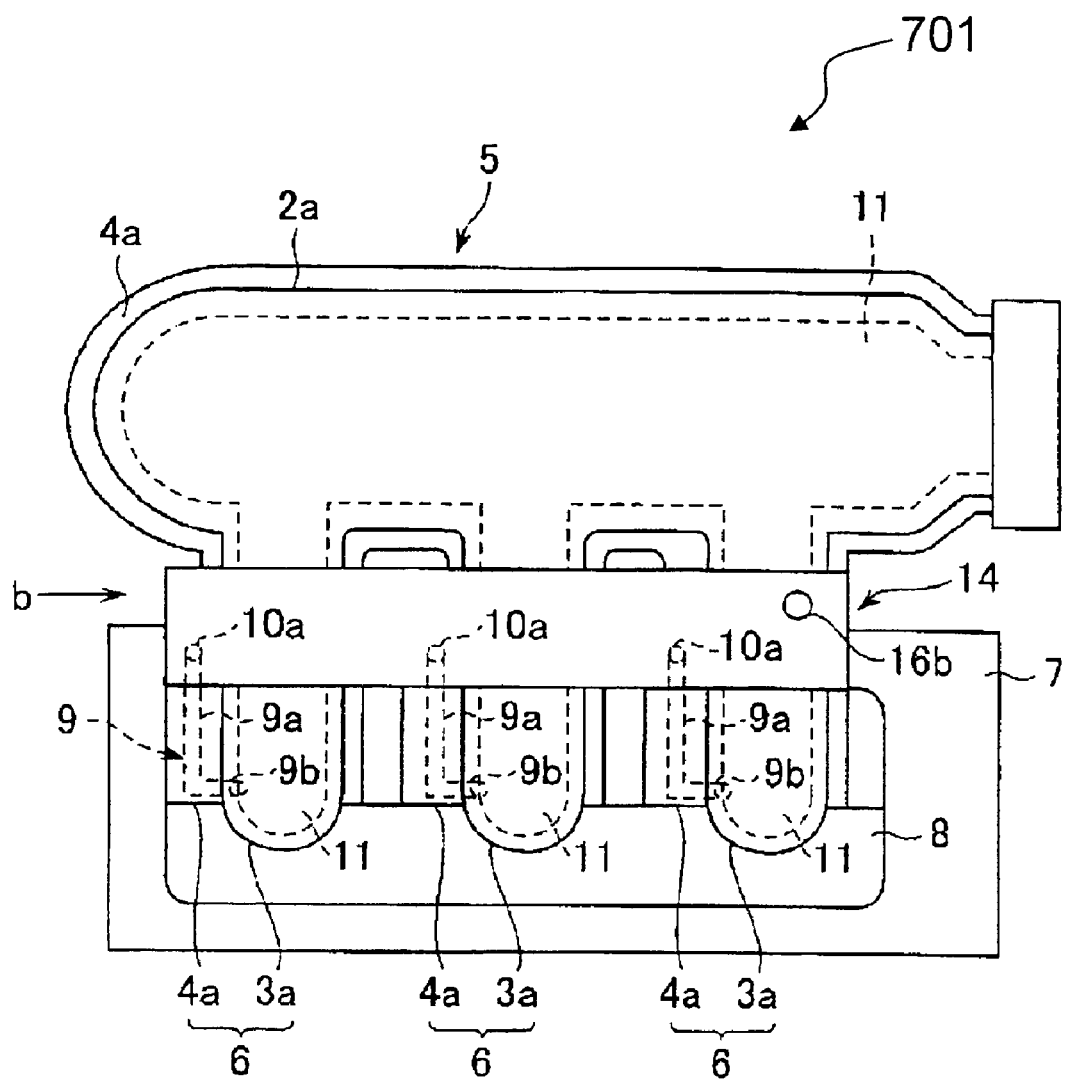
FIG. 21 is a side elevational view of an engine air intake manifold in accordance with a seventh embodiment of the present invention.
Figure 22:
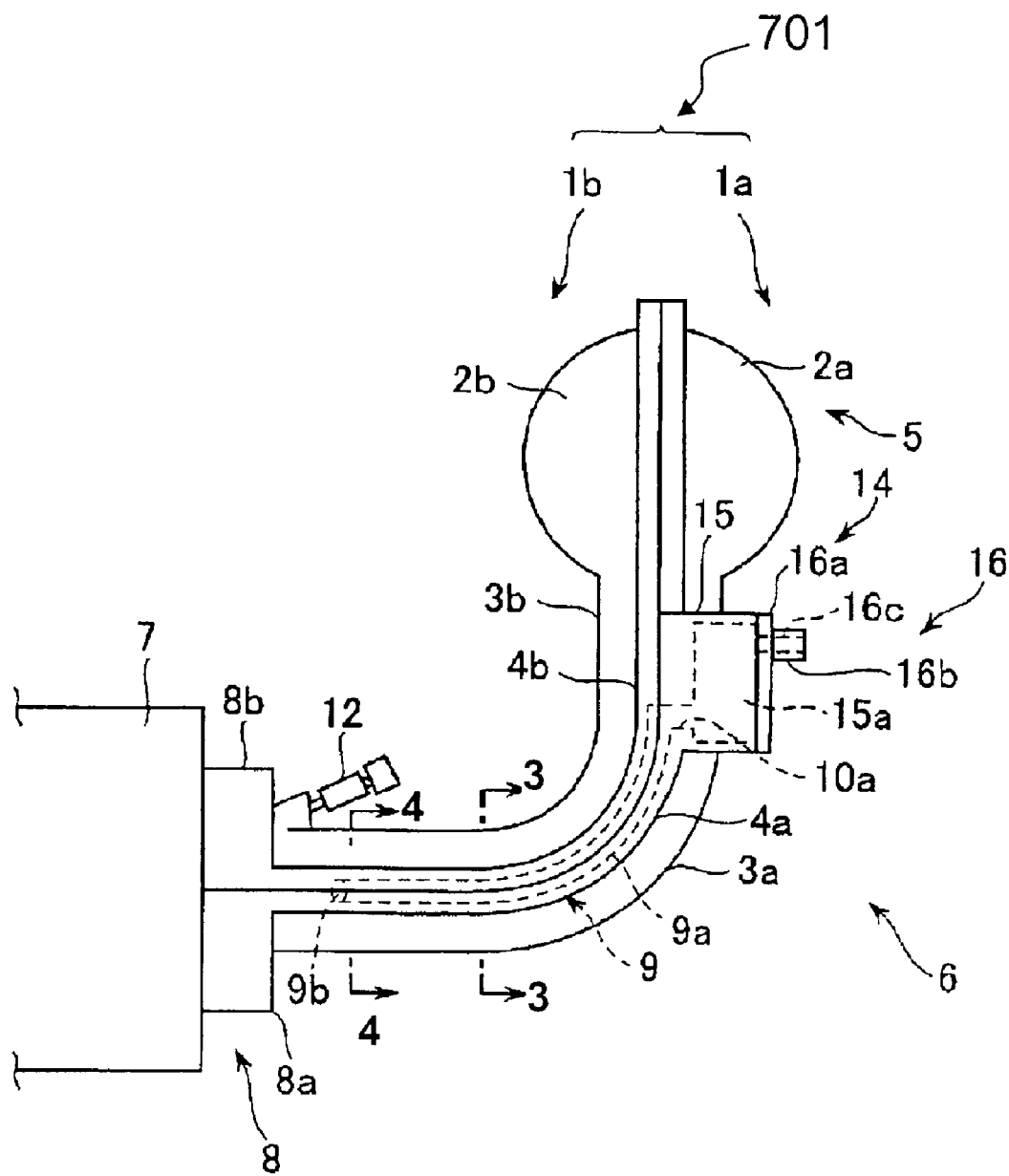
FIG. 22 is an end elevational view of the engine air intake manifold illustrated in FIG. 21 as viewed along the direction of arrow b in FIG. 21.

Referring now to FIGS. 21 and 22, an air intake manifold 701 is illustrated in accordance with a seventh embodiment of the present invention. Basically, the air intake manifold 701 is identical to the air intake manifold 1, except that the chamber unit 14 of FIG. 13 has replaced the introducing parts 10. In view of the similarity between this embodiment and the prior embodiments, the descriptions of the parts of this embodiment that are identical to the parts of the first embodiment may be omitted for the sake of brevity.

FIG. 21 is a side view of a multiple-cylinder-engine air intake manifold 701 in accordance with the seventh embodiment of the present invention, while FIG. 22 is an end view from the direction of arrow b in FIG. 21. The air intake manifold 1 is made of resin and curves in a vertical direction from a lateral side of an engine main body 7 when it is mounted to the engine main body 7, similar to the prior embodiments. Similarly to the prior embodiments, this air intake manifold 701 includes a collector 5, a plurality of air intake branch pipes 6 that branch from the collector 5, and a mounting flange 8 for mounting to an engine main body 7. Similarly to FIG. 1, air intake passages 11 of the air intake manifold 701 are formed inside the collector 5 and the air intake branch pipes 6. The air intake branch pipes 6 are formed correspondently with respect to the cylinders of the engine and distribute/supply air to the cylinders. As shown in FIG. 22, the air intake manifold 301 comprises main body sections 1a and 1b that are divided along the direction in which the air flows through the air intake branch pipes 6. The cross section of the air intake branch pipes 6 as viewed along section line 3—3 of FIG. 22 has the same configuration as the first and second embodiments as seen in FIGS. 3(a) and 3(b). While only one of the air intake branch pipes 6 is illustrated in detail herein, it will be apparent from this disclosure that all of the air intake branch pipes 6 have the same structure.

The main body section 1a includes an air intake passage forming part 2a, a plurality of air intake passage forming parts 3a that branch from the air intake passage forming part 2a, a flange part 4a formed in a protruding manner along the mating faces of the air intake-forming sections 2a and 3a, and a mounting flange part 8a formed on the downstream end parts of the air intake passage forming parts 3a. Similarly, the main body section 1b includes an air intake passage forming part 2b, a plurality of air intake passage forming parts 3b that branch from the air intake passage forming part 2b, a flange part 4b formed in a protruding manner along the mating faces of the air intake-forming sections 2b and 3b, and a mounting flange part 8b formed on the downstream end parts of the air intake passage forming parts 3b. The main body sections 1a and 1b are mated tightly together at the flange parts 4a and 4b, which serve as mating parts. The air intake passage forming parts 2a and 2b form the collector 5, the air intake passage forming parts 3a and 3b and flange parts 4a and 4b form the air intake branch pipes 6, and the mounting flange parts 8a and 8b form the mounting flange 8. The fuel injection devices 12 for delivering fuel into the intake air are mounted to the upper surface of downstream portions of the air intake passage forming parts 3b.

Gas passages 9 for carrying the secondary additive gas are formed along the mating surfaces of the flange parts 4a and 4b. In this embodiment, the secondary additive gas is blow-by gas, but it is also acceptable to use EGR gas or idle-control-use secondary air. A gas passage 9 is formed for each air intake branch pipe 6 and each gas passage 9 slants downward from upstream to downstream when the air intake manifold 701 is mounted to the engine main body 7.

The chamber unit 14 is provided in the vicinity of the upstream ends of the gas passages 9. More specifically, the chamber unit 14 is provided on the outside wall of the main body section 1a at the substantially vertical portion of the air intake branch part, which is curved vertically from a lateral side of the engine main body 7. As shown in FIG. 22, the chamber unit 14 comprises a frame part 15 that is so formed as to traverse the air intake branch pipes 6 and a lid 16 that is mounted to the frame part 15. The frame part 15 projects from the outside wall of the air intake branch part so as to form a space 15a there-within, and introducing holes 10a that communicate with the gas passages 9 are provided in a lower portion of the outside wall of the air intake branch part inside the space 15a. The lid 16 comprises a lid main body 16a and an introducing part 16b. The lid main body 16a is a plate-shaped member and the introducing part 16b is a cylindrical member so formed as to protrude from the lid main body 16a. The introducing part 16b has an introducing hole 16c so formed as to run in the axial direction of the introducing part 16b and pass through the lid main body 16a. When the lid 16 is mounted to the frame part 15 to form the chamber unit 14, the space 15a inside the frame part 15 forms a chamber 15a.

Instead of forming the chamber 15a with a space 15a in the frame part 15, it is also acceptable to form the chamber 15a by providing a recessed part in the lid 16 as seen in FIG. 13. FIG. 11 illustrates an example in which a recessed part is provided in the lid 16.

In this air intake manifold 701, the secondary additive gas is first introduced into the chamber 15a through the introducing holes 10a and then directed from the chamber 15a to the first passage portions 9a through the introducing holes 10a. The secondary additive gas flows downward along the mating parts of the air intake branch pipes 6 and is fed into the air intake passages 11 from the second passage portions 9b in the vicinity of the mounting flange 8.

In this air intake manifold 701, the chamber unit 14 is so formed on a substantially vertically oriented portion of the air intake branch pipes 6 as to traverse the air intake branch pipes 6. Thus, the chamber 15a can be made long in the lengthwise and widthwise directions and a large-volume chamber 15a can be obtained without increasing the size in the thickness direction. Additionally, a large volume can be secured for the chamber 15a by effectively utilizing the wasted space between the cylindrical air intake branch pipes 6 while avoiding increasing the size of the air intake manifold 701. As a result, when air intake pulsations occur, the pulsations and pressure fluctuations can be absorbed inside the chamber 15a and the degree of uniformity with which the secondary additive gas is distributed to the cylinders is increased.

Also, since the secondary additive gas travels downward as it flows from the introducing hole 16c into the chamber 15a and out through the introducing holes 10a, water condensation can be prevented from collecting in the chamber 15a. Additionally, the manufacturing process is simple because the frame part 15 or base part 17 can be formed simultaneously with the main body sections 1a and 1b by resin molding.

Since the gas passages 9 can be formed using the mating parts (flange parts 4a and 4b) of the air intake branch pipes 6, it is not necessary to provide gas passages separately on the outside of the air intake branch pipes 6 and the cost and weight of the air intake manifold can be reduced through reduction of the number of parts. Also, hindering of the arrangement of other parts can be prevented because it is not necessary to provide gas passages separately on the outside of the air intake branch pipes 6.

Since the gas passages 9 can be formed by making grooves in the mating parts when the main body sections 1a and 1b are formed by die cutting or by inserting a gasket 13 in-between when the main body sections 1a and 1b are mated tightly together, there is no need for machining or the connection of separate members in order to form the gas passages 9 and the manufacturing process is simple.

By introducing the secondary additive gas in the vicinity of the mounting flange 8 at the downstream side of each air intake branch pipe 6, contamination of the air intake passages 11 can be prevented and the control response of the secondary additive gas can be improved.

Since the gas passages 9 are formed so as to slant downward and avoid the fuel injection devices 12, water condensation is prevented from collecting inside the gas passages 9.

Eighth Embodiment

Figure 23:
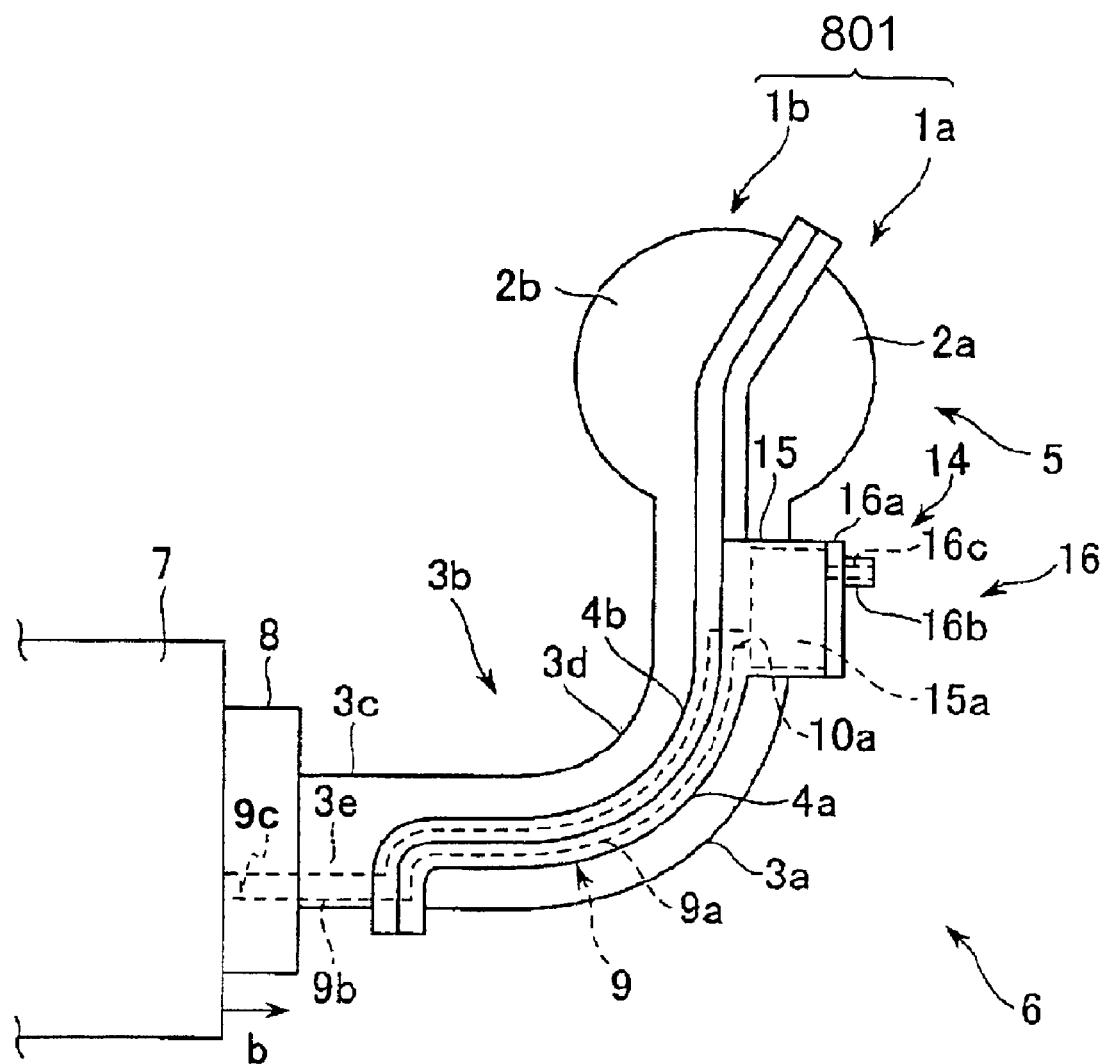
FIG. 23 is an end elevational view of an engine air intake manifold in accordance with an eighth embodiment of the present invention.

Referring now to FIG. 23, an end elevational view of an air intake manifold 801 is illustrated in accordance with an eighth embodiment of the present invention. Basically, the air intake manifold 801 is identical to the air intake manifold 201, except that the chamber unit 14 of FIG. 13 has replaced the introducing parts 10. In view of the similarity between this embodiment and the prior embodiments, the descriptions of the parts of this embodiment that are identical to the parts of the first embodiment may be omitted for the sake of brevity.

Similarly to the prior embodiments, this air intake manifold 801 includes a collector 5, a plurality of air intake branch pipes 6 that branch from the collector 5, and a mounting flange for mounting to an engine main body 7. Similarly to FIG. 1, the air intake passages 11 of the air intake manifold 801 are formed inside the collector 5 and the air intake branch pipes 6. As shown in FIG. 23, the air intake manifold 801 comprises main body sections 1a and 1b that are divided along the direction in which the air flows through the air intake branch pipes 6 that is identical to the second embodiment. While only one of the air intake branch pipes 6 is illustrated in detail herein, it will be apparent from this disclosure that all of the air intake branch pipes 6 have the same structure.

The main body section 1b includes a semi-cylindrical air intake passage forming part 2b and a plurality of air intake passage forming sections 3b that branch from the air intake passage forming part 2b. The air intake passage forming parts 3b are made up of a cylindrical part 3c and a semi-cylindrical part 3d. A flange part 4b is formed on the air intake passage forming parts 2b and 3b along the mating surface. The cylindrical part 3c is formed integrally with the mounting flange 8 (which mounts to the engine main body 7) and a thick-walled part 3e is formed on a portion of the outside surface of the cylindrical part 3c. The semi-cylindrical part 3d continues in the upstream direction from the upstream end face of the cylindrical part 3c.

The main body section 1a includes a semi-cylindrical air intake passage forming part 2a and a plurality of semi-cylindrical air intake passage forming sections 3a that branch from the air intake passage forming part 2a and are formed to correspond to the mating surfaces of the cylindrical parts 3c and semi-cylindrical parts 3d of the main body section 1b. A flange part 4a is formed on the main body section 1a along the mating surface.

The main body sections 1a and 1b are so configured that when they are mated tightly together at the flange parts 4a and 4b, a plurality of air intake passages 11 are formed inside and gas passages 9 for supplying a secondary additive gas are so formed that a portion thereof follows along the flange parts 4a and 4b. The gas passages 9 are formed in the flange parts 4a and 4b of each air intake branch part 6. Each gas passage 9 includes a first passage portion 9a that is formed in the mating surfaces of the flange parts 4a and 4b, a second passage portion 9b that communicates with the first passage portion 9a and passes downstream through the thick-walled part 3e and the mounting flange 8, and a third passage portion 9c that communicates between the second passage portion 9b and the air intake passage 11 at the end face of the mounting flange 8 as shown in FIG. 7. Also similarly to the first embodiment, a chamber unit 14 is provided in the vicinity of the upstream ends of the gas passages 9 and the first passage portions 9a of the gas passages 9 communicate with the chamber 15a or 16d through the introducing holes 10a.

Again similarly to the first embodiment, the secondary additive gas is first introduced into the chamber 15a or 16d through the introducing holes 10a and then directed from the chamber 15a or 16d to the first passage portions 9a through the introducing holes 10a. The secondary additive gas then passes through the first passage portion 9a and the second passage portion 9b to the downstream end face of the mounting flange 8 and is fed into the air intake passage 11 from the third passage 9c at the downstream end face of the mounting flange 8.

Similarly to the first embodiment, this air intake manifold 801 enables a large-volume chamber 15a or 16d to be formed while effectively utilizing the space between the air intake branch pipes 6 and keeping the size of the air intake manifold 801 in check. As a result, the chamber 15a or 16d can absorb the pulsations and pressure fluctuations resulting from intake pulsations and the degree of uniformity with which the secondary additive gas is distributed to the cylinders can be increased.

Similarly to the first embodiment, the gas passages 9 can be formed by making grooves in the mating parts when the main body sections 1a and 1b are formed by die cutting or by inserting a gasket 13 in-between when the main body sections 1a and 1b are mated tightly together and the second passage 9b and third passage 9c can be formed by die cutting. As a result, the manufacturing process is simple and there is no need for machining or the connection of separate members in order to form the gas passages 9.

Since the secondary additive gas is introduced at the end face of the mounting flange 8, similarly to the previous explanation, contamination of the throttle valve can be prevented, contamination of the inside of the air intake passages 11 can be reduced, and the control response of the air-fuel mixture can be improved.

Since the gas passages 9 are formed so as to slant downward and avoid the fuel injection devices 12, water condensation is prevented from collecting inside the gas passages 9.

Ninth Embodiment

Figure 24:
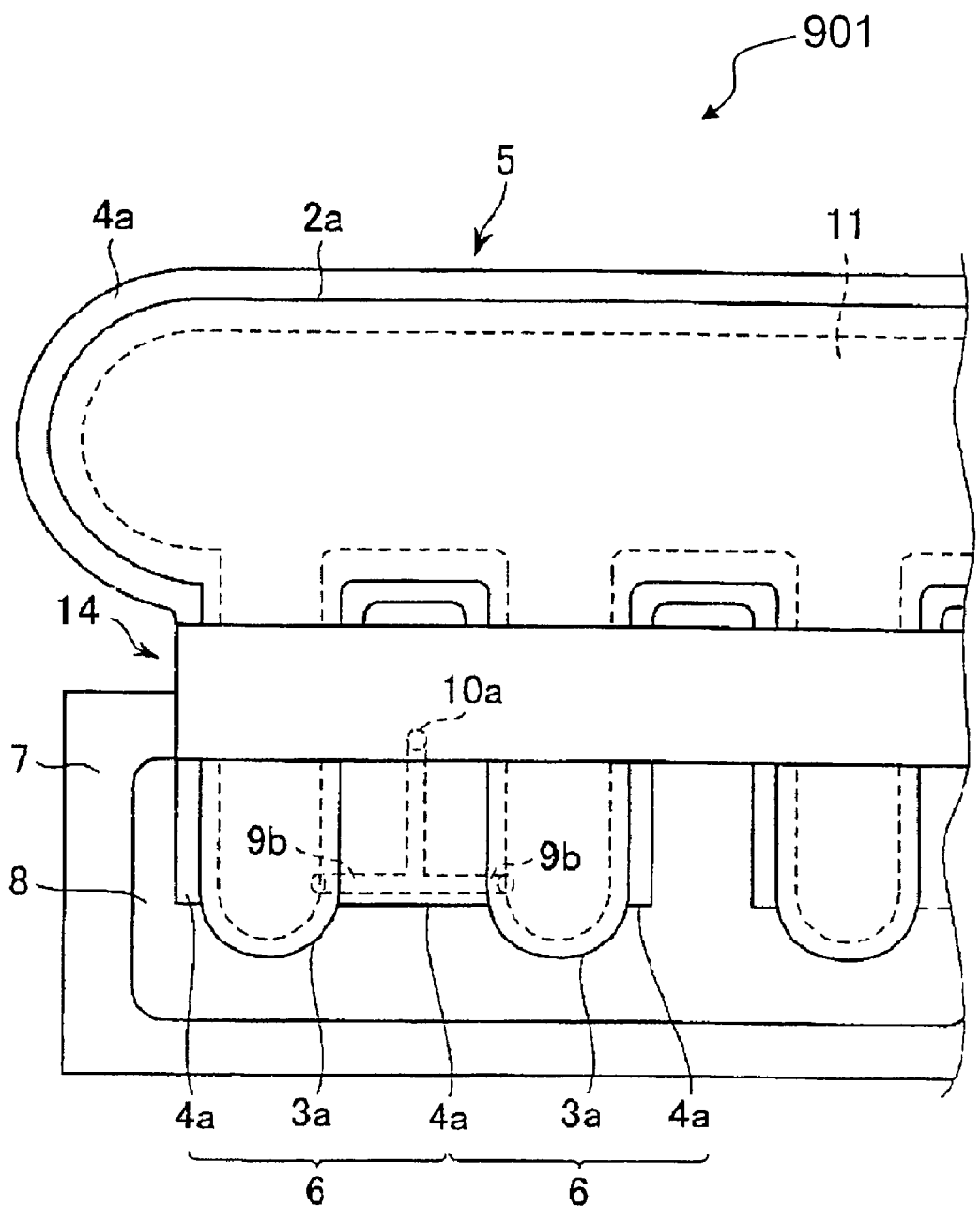
FIG. 24 is a side elevational view of an engine air intake manifold in accordance with a ninth embodiment of the present invention.

Referring now to FIG. 24, a partial side elevational view of an air intake manifold 901 is illustrated in accordance with a ninth embodiment of the present invention. In view of the similarity between this embodiment and the prior embodiments, the descriptions of the parts of this embodiment that are identical to the parts of the first embodiment may be omitted for the sake of brevity.

This air intake manifold 901 is a combination of the third and sixth embodiments. Specifically, the air intake manifold 901 is the same as the air intake manifold 301 of the third embodiment but with the additional requirement that the flange parts 4a and 4b between at least one pair of adjacent air intake branch pipes 6 be formed integrally with each other as in the sixth embodiment. When the engine has an even number of cylinders, e.g., four, it is also acceptable for the flange parts 4a and 4b between all adjacent air intake branch pipes 6 to be formed integrally with one another or for the flange parts 4a and 4b between a portion of adjacent air intake flange pipes 6 to be formed integrally with one another.

In the integrally formed flange parts 4a and 4b are formed gas passages 9 that serve to supply a secondary additive gas to the air intake passages 11 of adjacent air intake branch pipes 6. The gas passages 9 each comprise a first passage portion 9a and a second passage portion 9b. Each first passage portion 9a is formed along the mating surfaces of the flange parts 4a and 4b. Similarly to the first embodiment, a chamber unit 14 is provided at the upstream ends of the first passage portions 9 and the upstream ends of the first passage portions 9a communicate with the chamber 15a or 16d through introducing holes 10a. The second passage 9b branches in both directions from the first passage 9a in the vicinity of the mounting flange 8 and communicates with the air intake passages 11 of the air intake branch pipes 6 on both sides. While only one of the adjacent pairs of the air intake branch pipes 6 is illustrated in detail herein, it will be apparent from this disclosure that all of the adjacent pairs of the air intake branch pipes 6 have the same structure.

The air intake manifold 901 uses the chamber unit of FIG. 10 or 13. The secondary additive gas is first introduced into the chamber 15a or 16d through the introducing holes 10a and then directed from the chamber 15a or 16d to the first passage portions 9a through the introducing holes 10a. The secondary additive gas then passes through the first passage portions 9a, branches into the second passage portions 9b, and is fed into the air intake passages 11 of adjacent air intake branch pipes 6.

In this air intake manifold 901, the secondary additive gas can be supplied to the air intake passages 11 using gas passages 9 that are common to adjacent air intake branch pipes 6. As a result, the air intake manifold 901 can be reduced in size compared to a case in which the flange parts 4a and 4b are made wider and a gas passage 9 is formed with respect to each air intake branch pipe 6.

Insert 23

Figure 25:
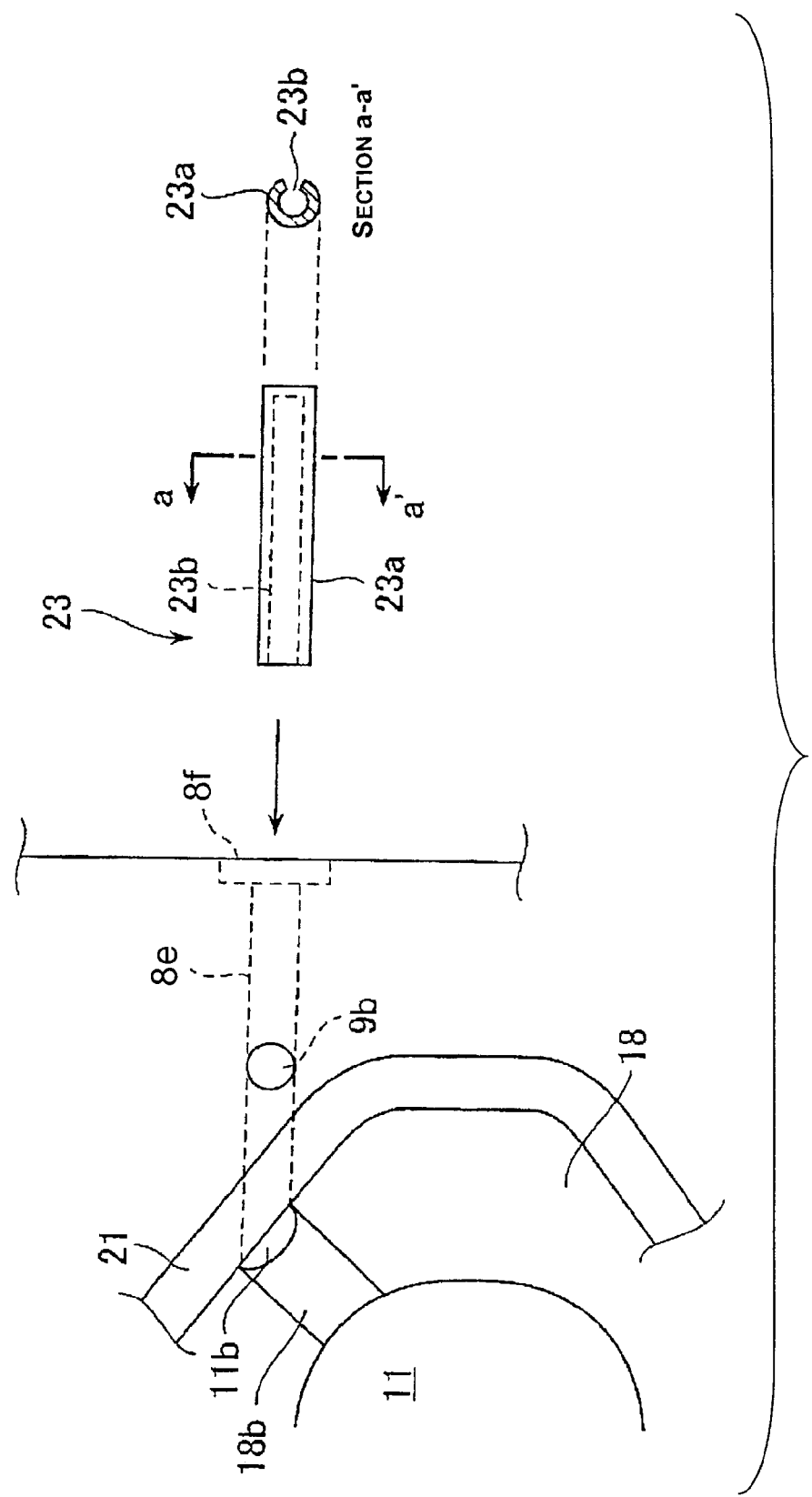
FIG. 25 is a diagrammatic exploded elevational view of the main features of an insert for the air intake manifolds of the present invention.

In the above described third, fourth and fifth embodiments, instead of blocking the downstream opening of the second passage portion 9b, it is also acceptable to press fit or adhesively secure an insert 23 in the opening of the through hole 8e (which forms the third passage portion) as shown in FIG. 25. As shown in FIG. 25, the insert 23 has a C-shaped cross section and is hollow. The insert 23 has an axially oriented slit 23b is provided in a portion of the outside wall 23a. The insert is closed at one end and open at the other. When the insert 23 is inserted into the third passage portion 8e in the direction of the arrow, the outside wall 23a blocks the downstream side of the second passage portion 9b and the closed end obstructs the external opening of the third passage portion 8e. Meanwhile, the slit 23b and the internal space of the insert allow the second passage portion 9b and the fourth passage portion 11b to communicate. The secondary additive gas passes from the second passage portion 9b through the slit 23b of the insert 23, travels through the internal space of the insert, is directed into the fourth passage portion 11b from the open end of the insert 23, and is fed into the air intake passage 18 from the fifth passage portion 18b.

With an air intake manifold using the insert 23, the secondary additive gas can be directed from the secondary passage portion 9b to the fourth passage portion 11b formed in the mating surfaces of the recessed part 11a and the valve mounting block 18 even when the second passage portion 9b is formed by machining from the downstream end face of the mounting flange 8 to the flange part 4b.

Furthermore, the manufacturing process is simplified because the downstream side of the second passage portion 9b and the external opening of the third passage portion 8e are obstructed simultaneously when the insert 23 is inserted into the third passage portion 8e.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. Also terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-040772, 2003-063061 and 2003-076919. The entire disclosures of Japanese Patent Application Nos. 2003-040772, 2003-063061 and 2003-076919 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine air intake manifold comprising:
a first main body section having a first mating part; and
a second main body section having a second mating part that is fixedly coupled to the first mating part to form an air intake passage therebetween,
the first and second mating parts of the first and second main body sections being configured and arranged to be divided along an airflow direction of the air intake passage with a gas passage being formed by the first and second mating parts in the airflow direction of the air intake passage and the gas passage opening into a downstream portion of the air intake passage to supply a secondary additive gas thereto.

2. The engine air intake manifold according to claim 1, wherein
the first and second main body sections are configured to form an air intake branch part having a plurality of air intake branch passages, each of the air intake branch passages being formed between the first and second main body sections.

3. The engine air intake manifold according to claim 2, wherein
the gas passage is configured and arranged to slant downwardly from an upstream portion of the first and second main body sections to a downstream portion of the first and second main body sections when the air intake manifold is mounted to an engine main body.

4. The engine air intake manifold according to claim 2, wherein
the first and second main body sections each have a substantially semi-cylindrical air intake passage forming part and a flange part that protrudes radially outward from the air intake passage forming part such that the flange parts of the first and second main body sections form the first and second mating parts with the gas passage.

5. The engine air intake manifold according to claim 4, wherein
the air intake branch part is further equipped with an engine main body mounting flange comprises a first mounting part integrally with the first main body section and a second mounting part being formed integrally with the second main body section.

6. The engine air intake manifold according to claim 5, wherein
the gas passage has first and second passage portions with the first passage portion extending along the first and second flange parts of the first and second main body sections from an upstream end to a downstream end located in a vicinity of the mounting flange, and the second passage portion being arranged to communicate between the downstream end of the first passage portion and the air intake passage.

7. The engine air intake manifold according to claim 2, wherein
the first main body section has a first air intake passage forming part and a first flange part, the first air intake passage forming part comprising a cylindrical part formed integrally with an engine main body mounting flange and a semi-cylindrical part formed so as to continue uninterruptedly toward an upstream side from an end face of the cylindrical part, and the first flange part protruding radially outward from the first air intake passage forming part;
the second main body section has a semi-cylindrical air intake passage forming part and a second flange part protruding radially outward from the semi-cylindrical air intake passage forming part;
the first and second flange parts of the first and second main body sections form the first and second mating parts with the gas passage; and
the air intake passage forming parts defining the air intake passages.

8. The engine air intake manifold according to claim 4, wherein
the flange parts between adjacent pairs of the air intake passages are formed integrally; and
the gas passage formed along the flange parts between the air intake passages are configured to introduce a secondary additive gas into each of the adjacent pairs of the air intake passages.

9. The engine air intake manifold according to claim 2, wherein
one of the first and second main body sections includes a chamber configured and arranged to introduce a secondary additive gas, the chamber being formed on an outside wall of the air intake branch part and extending traversely across the air intake branch passages.

10. The engine air intake manifold according to claim 9, wherein
the chamber includes a frame part formed on the air intake branch part and a lid mounted to the frame part, the frame part defining a transverse space that is fluidly connected with the air intake branch passages.

11. The engine air intake manifold according to claim 9, wherein
the chamber includes a base part and a lid formed with an inside recess, and the lid being mounted to the base part with the inside recess of the lid facing the base part and being fluidly connected with the air intake branch passages.

12. The engine air intake manifold according to claim 2, wherein
the air intake branch part has a valve mounting block disposed in a downstream portion of the air intake branch part; and
the gas passage is further formed by at least a portion of mating surfaces of the air intake branch part and the valve mounting block.

13. The engine air intake manifold according to claim 12, wherein
the gas passage includes a first passage portion formed along the first and second mating parts and a second passage portion continues uninterruptedly to a downstream end face of the valve mounting block and opens into the air intake passages through a third passage portion formed in the downstream end face.

14. The engine air intake manifold according to claim 12, wherein
the gas passage includes a first passage portion formed along the first and second mating parts and an additional passage portion disposed in the air intake branch part and communicating with the first passage portion, the additional passage portion being defined by an outside surface of the valve mounting block and a groove formed in an inside surface of the air intake branch part.

15. The engine air intake manifold according to claim 12, wherein
the gas passage includes a first passage portion formed along the first and second mating parts and an additional passage portion disposed in the air intake branch part and communicating with the first passage portion, the additional passage portion being defined by an inside surface of the air intake branch part and a groove formed in an outside surface of the valve mounting block.

16. The engine air intake manifold according to claim 12, wherein
the gas passage includes
a first passage portion formed along the first and second mating parts;
a second passage portion communicating with the first passage portion;
a third passage portion passing from an outside to an inside surface of the air intake branch part;

a fourth passage portion opening to the downstream end face of the air intake branch part and communicating with the second passage portion via the third passage portion; and a hollow insert having a slit formed along an axial direction and being disposed in the third passage portion such that the downstream sides of the fourth passage portion and the third passage portion are blocked and the fourth passage portion and the second passage portion are connected via the slit.

17. The engine air intake manifold according to claim 16, wherein
the fourth passage portion is defined by an outside surface of the valve mounting block and a groove formed in an inside surface of the air intake branch part.

18. The engine air intake manifold according to claim 16, wherein
the fourth passage portion is defined by an inside surface of the air intake branch part and a groove formed in an outside surface of the valve mounting block.

19. The engine air intake manifold according to claim 12, wherein
the gas passage is configured and arranged to slant downwardly from an upstream portion of the first and second main body sections to a downstream portion of the first and second main body sections when the air intake manifold is mounted to an engine main body.

20. The engine air intake manifold according to claim 12, wherein
the first main body section has a first air intake passage forming part and a first flange part, the first air intake passage forming part comprising a cylindrical part formed integrally with an engine main body mounting flange and a semi-cylindrical part formed so as to continue uninterruptedly toward an upstream side from an end face of the cylindrical part, and the first flange part protruding radially outward from the first air intake passage forming part;
the second main body section has a semi-cylindrical air intake passage forming part and a second flange part protruding radially outward from the semi-cylindrical air intake passage forming part;
the first and second flange parts of the first and second main body sections form the first and second mating parts with the gas passage; and
the air intake passage forming parts defining the air intake passages.

21. The engine air intake manifold according to claim 12, wherein
one of the first and second main body sections includes a chamber configured and arranged to introduce a secondary additive gas, the chamber being formed on an outside wall of the air intake branch part and extending traversely across the air intake branch passages.

22. The engine air intake manifold according to claim 21, wherein
the chamber includes a frame part formed on the air intake branch part and a lid mounted to the frame part, the frame part defining a transverse space that is fluidly connected with the air intake branch passages.

23. The engine air intake manifold according to claim 22, wherein
the chamber includes a base part and a lid formed with an inside recess, and the lid being mounted to the base part with the inside recess of the lid facing the base part and being fluidly connected with the air intake branch passages.

24. The engine air intake manifold according to claim 9, wherein
the gas passage is configured and arranged to slant downwardly from an upstream portion of the first and second main body sections to a downstream portion of the first and second main body sections when the air intake manifold is mounted to an engine main body.

25. The engine air intake manifold according to claim 9, wherein
the first and second main body sections each have a substantially semi-cylindrical air intake passage forming part and a flange part that protrudes radially outward from the air intake passage forming part such that the flange parts of the first and second main body sections form the first and second mating parts with the gas passage.

26. The engine air intake manifold according to claim 25, wherein
the air intake branch part is further equipped with an engine main body mounting flange comprises a first mounting part integrally with the first main body section and a second mounting part being formed integrally with the second main body section.

27. The engine air intake manifold according to claim 26, wherein
the gas passage has first and second passage portions with the first passage portion extending along the first and second flange parts of the first and second main body sections from an upstream end to a downstream end located in a vicinity of the mounting flange, and the second passage portion being arranged to communicate between the downstream end of the first passage portion and the air intake passage.

28. The engine air intake manifold according to claim 9, wherein
the first main body section has a first air intake passage forming part and a first flange part, the first air intake passage forming part comprising a cylindrical part formed integrally with an engine main body mounting flange and a semi-cylindrical part formed so as to continue uninterruptedly toward an upstream side from an end face of the cylindrical part, and the first flange part protruding radially outward from the first air intake passage forming part;
the second main body section has a semi-cylindrical air intake passage forming part and a second flange part protruding radially outward from the semi-cylindrical air intake passage forming part;
the first and second flange parts of the first and second main body sections form the first and second mating parts with the gas passage; and
the air intake passage forming parts defining the air intake passages.

29. The engine air intake manifold according to claim 25, wherein
the flange parts between adjacent pairs of the air intake passages are formed integrally; and
the gas passages formed along the flange parts between the air intake passages are configured to introduce a secondary additive gas into each of the adjacent pairs of the air intake passages.

30. The engine air intake manifold according to claim 9, wherein
the air intake branch part has a valve mounting block disposed in a downstream portion of the air intake branch part; and the gas passage is further formed by at least a portion of mating surfaces of the air intake branch part and the valve mounting block.

31. The engine air intake manifold according to claim 30, wherein
the gas passage includes a first passage portion formed along the first and second mating parts and a second passage portion continues uninterruptedly to a downstream end face of the valve mounting block and opens into the air intake passages through a third passage portion formed in the downstream end face.

32. The engine air intake manifold according to claim 30, wherein
the gas passage includes a first passage portion formed along the first and second mating parts and an additional passage portion disposed in the air intake branch part and communicating with the first passage portion, the additional passage portion being defined by an outside surface of the valve mounting block and a groove formed in an inside surface of the air intake branch part.

33. The engine air intake manifold according to claim 30, wherein
the gas passage includes a first passage portion formed along the first and second mating parts and an additional passage portion disposed in the air intake branch part and communicating with the first passage portion, the additional passage portion being defined by an inside surface of the air intake branch part and a groove formed in an outside surface of the valve mounting block.

34. The engine air intake manifold according to claim 30, wherein
the gas passage includes
a first passage portion formed along the first and second mating parts;
a second passage portion communicating with the first passage portion;
a third passage portion passing from an outside to an inside surface of the air intake branch part;
a fourth passage portion opening to the downstream end face of the air intake branch part and communicating with the second passage portion via the third passage portion; and
a hollow insert having a slit formed along an axial direction and being disposed in the third passage portion such that the downstream sides of the fourth passage portion and the third passage portion are blocked and the fourth passage portion and the second passage portion are connected via the slit.

35. The engine air intake manifold according to claim 34, wherein
the fourth passage portion is defined by an outside surface of the valve mounting block and a groove formed in an inside surface of the air intake branch part.

36. The engine air intake manifold according to claim 34, wherein
the fourth passage portion is defined by an inside surface of the air intake branch part and a groove formed in an outside surface of the valve mounting block.

37. The engine air intake manifold according to claim 2, wherein
the air intake branch part is further equipped with an engine main body mounting flange integrally with only one of the first and second main body sections.

38. An engine air intake manifold comprising:
main body means for defining an air intake passage; and
mating means for fixedly coupling two sections of the main body means;
the mating means being configured and arranged on the main body means to extend along an airflow direction of the air intake passage with a gas passage being formed by the mating means in the airflow direction of the air intake passage and opening into a downstream portion of the air intake passage to supply a secondary additive gas thereto.

* * * * *